United States Patent [19]

Garshelis

[11] Patent Number: 4,896,544
[45] Date of Patent: Jan. 30, 1990

[54] MAGNETOELASTIC TORQUE TRANSDUCER

[75] Inventor: Ivan J. Garshelis, Pittsfield, Mass.

[73] Assignee: Mag Dev Inc., Pittsfield, Mass.

[21] Appl. No.: 119,531

[22] Filed: Nov. 17, 1987

Related U.S. Application Data

[63] Continuation-in-part of Ser. No. 938,404, Dec. 5, 1986, Pat. No. 4,760,745, and Ser. No. 95,774, Sep. 14, 1987.

[51] Int. Cl.$^4$ .............................................. G01L 3/10
[52] U.S. Cl. .................................................. 73/862.36
[58] Field of Search ...................................... 73/862.36

[56] References Cited

U.S. PATENT DOCUMENTS

| | | |
|---|---|---|
| 3,011,340 | 12/1961 | Dahle . |
| 3,340,729 | 9/1967 | Scoppe . |
| 4,236,230 | 11/1980 | Thompson . |
| 4,364,278 | 12/1982 | Horter et al. . |
| 4,414,855 | 11/1983 | Iwasaki . |
| 4,506,554 | 3/1985 | Blomkvist et al. ............... 73/862.36 |
| 4,598,595 | 7/1986 | Vranish et al. . |
| 4,703,550 | 11/1987 | Hilzinger et al. . |
| 4,727,757 | 3/1988 | Hilzinger et al. . |
| 4,760,745 | 8/1988 | Garshelis ........................ 73/862.36 |
| 4,765,192 | 8/1988 | Hase et al. . |

FOREIGN PATENT DOCUMENTS

| | | |
|---|---|---|
| 0169326 | 1/1945 | Japan . |
| 58-9034 | 1/1983 | Japan . |
| 59-181575 | 10/1984 | Japan . |
| 0254678 | 12/1985 | Japan . |
| 61-195323 | 8/1986 | Japan . |
| 62-185136 | 8/1987 | Japan . |
| 63-81993 | 4/1988 | Japan . |
| 0274420 | 6/1970 | U.S.S.R. . |
| 667836 | 6/1979 | U.S.S.R. . |
| 838448 | 6/1981 | U.S.S.R. . |

OTHER PUBLICATIONS

Fleming, Automotive Torque Measurement: A Summary of Seven Different Methods, IEEE Trans. on Vehci. Tech., vol. VT–31, No. 3, Aug. 1982.

Nachschlagewertk Stahlschlussel, 6th Edition, Apr. 1962, p. 42.

(List continued on next page.)

Primary Examiner—Charles A. Ruehl
Attorney, Agent, or Firm—Sixbey, Friedman, Leedom & Ferguson

[57] ABSTRACT

A magnetoelastic torque transducer for providing an electrical signal indicative of the torque applied to a member, the member including ferromagnetic, magnetostrictive means affixed to, associated with or forming a part of the surface of the torqued member for altering in magnetic permeability in response to the application of torque to the member. The ferromagnetic, magnetostrictive means is advantageously formed of a thermally hardened or iron-nickel martensite hardenable steel alloy characterized by a substantially isotropic magnetostriction having an absolute value of at least 5 ppm and including from 0.05 to 0.75 percent by weight carbon and sufficient of one or more elements selected from Ni, Cr, Co, Ti, Al, Mn, Mo, Cu and B to raise the alloy magnetostriction to at least 5 ppm absolute. Preferably, the ferromagnetic, magnetostrictive means is formed of nickel maraging steel. The transducer comprises a pair of axially spaced-apart annular bands defined within a region of the ferromagnetic, magnetostrictive means, the bands being endowed with residual stress created, respectively symmetrical right and left hand helically directed magnetic anisotropy of sufficiently large magnitude that the contribution to total magnetic anisotropy of any random anisotropy in the member is negligible. In one aspect of the invention, each said band has at least one circumferential region which is free of residually unstressed areas over at least 50% of its circumferential length. In another aspect of the invention, the alloy is thermally hardened before the bands are endowed with the residual stress-created magnetic anisotropy.

50 Claims, 8 Drawing Sheets

OTHER PUBLICATIONS

Beth and Meeks, "Magnetic Measurement of Torque in a Rotating Shaft", The Review of Scientific Instruments, vol. 25, No. 6, Jun. 1954.

Harada et al., "A New Torque Transducer Using Stress Sensitive Amorphous Ribbons", IEEE Trans. on Mag., MAG-18, No. 6, 1767-9, (1982).

Sasada et al., "Torque Transducers with Stress-Sensitive Amorphous Ribbons of Chevron-Pattern", IEEE Trans. on Mag., MAG-20, No. 5, 951-53, (1984).

Mohri, "Review on Recent Advances in the Field of Amorphous-Metal Sensors and Transducers", IEEE Trans. on Mag., MAG-20, No. 5, 942-47, (1984).

Yamasaki et al., "Torque Sensors Using Wire Explosion Magnetostrictive Alloy Layers", IEEE Trans. on Mag., MAG-22, No. 5, 403-405, (1986).

Sasada et al., "Noncontact Torque Sensors Using Magnetic Heads and a Magnetostrictive Layer on the Shaft Surface-Application of Plasma Jet Spraying Process", IEEE Trans. on Mag., MAG-22, No. 5, 406-408, (1986).

Sasada et al., "Noncontact Torque Sensor", presented 11/19/85 at 11th IEEE Industrial Electronics Society Conference.

Angeid, "Noncontacting Torquemeters Utilizing Magneto-Elastic Properties of Steel Shafts", ASME 69-GT-64, (1968).

Sasada et al., "A New Method of Assembling a Torque Transducer by the Use of Bilayer-Structure Amorphous Ribbons", IEEE Trans. on Mag., MAG-19, No. 5, 2148-2150, (1983).

Winterhoff et al., "Non-Contact Torque Measurements Using Eddy Current Sensors", Technisches Messen (Germany), 50, No. 12, 461-466, (1983).

Scoppe et al., "Practical Application of Magnetostriction to a High Speed Torquemeter", 12 pages, presented Jun. 4-6, 1985, Thirteenth Transducer Workshop, Vehicular Instrumentation/Transducer Committee, Telemetry Group, Range Commanders Council.

Garshelis, "A Study of the Inverse Wiedemann Effect on Circular Remanence", IEEE Trans. on Mag., MAG-10, No. 2, 344-358, (1974).

Garshelis, "The Wiedemann Effects and Applications", 38 pages, presented Jun. 5-6, 1975 at Applied Magnetics Workshop, IEEE Magnetics Society, Marquette University.

Sasada et al., "Noncontact Torque Sensor Using Magnetic Heads and a Magnetostrictive Layer on the Shaft Surface", Abstract, (1986).

Hall et al., "The Metallurgy, Behavior, and Application of the 18-Percent Nickel Maraging Steels", NASA SP-5051, pp. 1-3, 5, 12-14, 23-41, 89-108, (1968).

"18% Nickel Maraging Steels", The International Nickel Company, Inc., pp. 4-30, (1964).

VASCOMAX 200-250-300-350, "Application Data for 18% Nickel Maraging Steels", Teleydyne Vasco, (1968).

MAGNETOELASTIC TORQUE TRANSDUCER

Cross-Reference To Related Applications

This application is a continuation-in-part of copending U.S. application Serial No. 938,404 filed Dec. 5, 1986, now U.S. Pat. No. 4,760,745 and copending U.S. Pat. application Ser. No. 095,774 filed Sept. 14, 1987.

Technical Field

The present invention relates to torque sensors and, more particularly, to non-contacting magnetoelastic torque transducers for providing a measure of the torque applied to a rotary shaft.

Background Art

In the control of systems having rotating drive shafts, it is generally recognized that torque is a fundamental parameter of interest. Therefore, the sensing and measurement of torque in an accurate, reliable and inexpensive manner has been a primary objective of workers for several decades. Although great strides have been made, there remains a compelling need for inexpensive torque sensing devices which are capable of continuous torque measurements over extended periods of time despite severe environments.

All magnetoelastic torque transducers have two features in common—(1) a torqued member which is ferromagnetic and magnetostrictive, the former to ensure the existence of magnetic domains and the latter to allow the orientation of the magnetization within each domain to be altered by the stress associated with applied torque; and (2) a means, most usually but not necessarily electromagnetic means, for sensing variations from the untorqued distribution of domain orientations. The differences among the various existing or proposed magnetoelastic torque transducers lie in the detailed variations of these common features.

It is well known that the permeability of magnetic materials changes due to applied stress. When a torsional stress is applied to a cylindrical shaft of magnetostrictive material, each element in the shaft is subjected to a shearing stress. This shearing stress may be expressed in terms of a tensile stress and an equal and perpendicular compressive stress, with the magnitude of each stress being directly proportional to the distance between the shaft axis and the element. The directions of maximum tension and compression occur along tangents to 45° left-handed and 45° right handed helices about the axis of the shaft. The effect of the torque is to increase the magnetic permeability in directions parallel to one of the helices and, correspondingly, to decrease the magnetic permeability in directions parallel to the other of the helices. In their article "Magnetic Measurements of Torque in a Rotating Shaft", The Review of Scientific Instruments, Vol. 25, No. 6, June, 1954, Beth and Meeks suggest that in order to use permeability change as a measure of the applied torque, one should monitor permeability along the principal stress directions and pass the magnetic flux through the shaft near its surface. This is because the stress is greater, the further the element is from the shaft axis and it is along the principal stress directions that the maximum permeability change is expected. To accomplish this, Beth and Meeks used a yoke carrying a driving coil for producing an alternating flux in the shaft and pickup coils on each of several branches to detect the permeability changes caused by the applied torque in flux paths lying in or near the principal stress directions in the shaft. When the shaft is subjected to a torque, the mechanical stresses attributable to torque resolve into mutually perpendicular compressive and tensile stresses which cause the permeability in the shaft to increase in the direction of one stress and decrease in the direction of the other. As a result, the voltage induced in the pickup or measuring coils increases or decreases. The difference in magnitude of the induced voltages is proportional to the torsional stress applied to the shaft. A similar approach was taken in U.S. Pat. No. 3,011,340—Dahle. The principal shortcoming in these type devices is the need to accomplish permeability sensing along the principal stress directions with its attendant disadvantages, such as its sensitivity to variations in radial distance from the shaft, magnetic inhomogeneity around the shaft circumference and noncompensatable dependence on shaft speed. As a result, devices such as these have only found applications on large diameter shafts, i.e., 6-inches and larger, but have not been found to be adaptable to smaller shafts where the vast majority of applications exist.

It was felt by some that devices such as were taught in Beth and Meeks and U.S. Pat. No. 3,011,340—Dahle, wherein the rotating shaft itself acted as the magnetic element in the transducer, had significant drawbacks in practical application. This is because the materials and metallurgical processing which may have been used to impart the desired mechanical properties to the shaft for its desired field of use will, in most cases, not be optimum or even desirable for the magnetic qualities required in a magnetoelastic torque sensor. The random anisotropy in a shaft created during its manufacture, due to internal stresses and/or resulting from regions of differing crystal orientation, will cause localized variations in the magnetic permeability of the shaft which will distort the desired correlation between voltage sensed and applied torque. The solution, according to U.S. Pat. No. 3,340,729—Scoppe is to rigidly affix, as by welding, a magnetic sleeve to the load-carrying shaft so that a torsional strain proportional to the torsional load is imparted to the sleeve. The measuring device employed now senses permeability changes in the rotating sleeve rather than in the rotating shaft. This permits, according to Scoppe, a material to be selected for the shaft which optimizes the mechanical and strength properties required for the shaft while a different material may be selected for the sleeve which optimizes its magnetic properties. As with prior art devices, the Scoppe torquemeter utilized a primary winding for generating a magnetic flux and two secondary windings, one oriented in the tension direction and the other in the compression direction. Although obviating at least some of the materials problems presented by Dahle, the use of a rigidly affixed sleeve creates other, equally perplexing problems. For example, the task of fabricating and attaching the sleeve is a formidable one and even when the attachment means is welding, which eliminates the bond strength problem, there remains the very significant problem that the coefficient of thermal expansion of the steel shaft is different (in some cases up to as much as 50% greater) than the corresponding coefficient of any magnetic material selected for the sleeve. A high temperature affixing process, such as welding, followed by cooling establishes stresses in the magnetic material which alters the resultant magnetic anisotropy in an uncontrolled manner. Moreover, annealing the shaft and sleeve to remove these stresses also anneals away desirable mechanical properties in the shaft and changes the magnetic properties of the sleeve. Furthermore, like the Dahle device, the shortcomings of Scoppe's transducer, due to its need to monitor permeability changes lying along the principal stress directions, are its sensitivity to variations in its radial distance from the shaft, magnetic inhomogeneity around the shaft circumference and dependence on shaft speed.

A different approach to magnetoelastic torque sensing utilizes the differential magnetic response of two sets of amorphous magnetoelastic elements adhesively attached to the torqued shaft. This approach has the advantage over prior approaches that it is insensitive to rotational position and shaft speed. However, it requires inordinate care in the preparation and attachment of the elements. Moreover, transducer performance is adversely affected by the methods used to conform the ribbon elements to the shape of the torqued member; the properties of the adhesive, e.g., shrinkage during cure, expansion coefficient, creep with time and temperature under sustained load; and, the functional properties of the amorphous material itself, e.g., consistency, stability. Still another concern is in the compatibility of the adhesive with the environment in which the transducer is to function, e.g., the effect of oil, water, or other solvents or lubricants on the properties of the adhesive.

In the article "A New Torque Transducer Using Stress Sensitive Amorphous Ribbons", IEEE Trans. on Mag., MAG-18, No. 6, 1767-9, 1982, Harada et al. disclose a torque transducer formed by gluing two circumferential stress-sensitive amorphous ribbons to a shaft at axially spaced apart locations. Unidirectional magnetoelastic magnetic anisotropy is created in each ribbon by torquing the shaft in a first direction, gluing a first ribbon to it, releasing the torque to set-up elastic torque stresses within the first ribbon, torquing the shaft in the opposite direction, gluing the second ribbon to it, and then releasing the torque to set-up elastic torque stresses within the second ribbon. The result is that the anisotropy in one ribbon lies along a right-hand helix at +45° to the shaft axis while the anisotropy in the other ribbon lies along an axially symmetric left-hand helix at −45° to the shaft axis. AC powered excitation coils and sensing coils surround the shaft making the transducer circularly symmetric and inherently free from fluctuation in output signal due to rotation of the shaft. In the absence of torque, the magnetization within the two ribbons will respond symmetrically to equal axial magnetizing forces and the sensing coils will detect no difference in the response of the ribbons. However, when torque is applied, the resulting stress anisotropy along the principal axes arising from the torque combines asymmetrically with the quiescent anisotropies previously created in the ribbons and there is then a differing response of the two ribbons to equal axial magnetizing force. This differential response is a function of the torque and the sensing coils and associated circuitry provide an output signal which is proportional to the applied torque. Utilizing substantially the same approach, in Japanese patent publication No. 58-9034, two amorphous ribbons are glued to a shaft and symmetrical magnetic anisotropy is given to the ribbons by heat treatment in a magnetic field at predetermined equal and opposite angles. Amorphous ribbons have also been glued to a shaft in a ±45° chevron pattern, see Sasada et al., IEEE Trans. on Mag., MAG-20, No. 5, 951-53, 1984, and amorphous ribbons containing parallel slits aligned with the ±45° directions have been glued to a shaft, see, Mohri, IEEE Trans. on Mag., MAG-20, No. 5, 942-47, 1984, to create shape magnetic anisotropy in the ribbons rather than magnetic anisotropy due to residual stresses. Other recent developments relevant to the use of adhesively attached amorphous ribbons in a magnetoelastic torque transducer are disclosed in U.S. Pat. No. 4,414,855—Iwasaki and U.S. Pat. No. 4,598,595—Vranish et al.

More recently, in apparent recognition of the severe shortcomings inherent in using adhesively affixed ribbons, plasma spraying and electrodeposition of metals over appropriate masking have been utilized. See: Yamasaki et al, "Torque Sensors Using Wire Explosion Magnetostrictive Alloy Layers", IEEE Trans. on Mag., MAG-22, No. 5, 403–405 (1986); Sasada et al, "Noncontact Torque Sensors Using Magnetic Heads and Magnetostrictive Layer on the Shaft Surface Application of Plasma Jet Spraying Process", IEEE Trans. on Mag., MAG-22, No. 5, 406–408 (1986).

The hereinbefore described work with amorphous ribbons was not the first appreciation that axially spaced-apart circumferential bands endowed with symmetrical, helically directed magnetic anisotropy contributed to an improved torque transducer. USSR Certificate No. 274,420 discloses a magnetoelastic torque measuring device, not unlike the Harada et al amorphous ribbon transducer, comprising a pair of sleeves which are initially deformed by applied torques of different directions to endow the sleeves with oppositely directed magnetic anisotropy and then mounted on a shaft in annular grooves formed therein. The grooves have a radial depth selected to accommodate the sleeves therewithin with the outer diameter of the sleeves coplanar with the outer surface of the shaft. Appropriate electronic circuitry is employed to sense the permeability change in the sleeves when a torque is applied to the shaft and to produce a corresponding electrical signal. There is no indication of the materials employed for the sleeves or the shaft. There is also no disclosure regarding the manner in which the deformed sleeves are affixed to the shaft. Whatever the technique, adhesive or welding, the resulting torque measuring device will suffer from the same drawbacks as with Scoppe's welded sleeves (U.S. Pat. No. 3,340,729) or Harada's adhesively affixed ribbons. USSR Certificate No. 667,836 discloses a magnetoelastic torque transducer having two axially spaced-apart circumferential bands on a shaft, the bands being defined by a plurality of slots formed in the shaft in a ±45° chevron pattern, and a pair of excitation and measuring coil-mounting circumferential bobbins axially located along the shaft so that a band underlies each bobbin. The shape anisotropy created by the slots is the same type of magnetic preconditioning of the shaft as was created, for example, by the chevron-patterned amorphous ribbons of Sasada et al and the slitted amorphous ribbons of Mohri, and suffers from many of the same shortcomings. Japanese Pat. No. 169,326 discloses means for measuring the torque in a rotating shaft formed of ferromagnetic material. The means includes a pair of axially spaced-apart bands on the shaft surface, the bands having knurls formed thereon at opposite angles of ±45° and coils surrounding the respective bands for sensing the change in magnetic flux when torque is applied to the shaft and for generating an emf proportional to the applied torque. There is no teaching in the patent of the process used for applying the knurl, of the ferromagnetic material used for the band portions of the shaft or of any thermal treatments of the shaft to anneal away stresses or to impart mechanical strength. Moreover, there is no disclosure in the patent of the specific knurl configuration or trough density, although the drawings suggest that the troughs are widely spaced apart. Certainly, there is no teaching that the bands include at least one circumferential region which is free of residually unstressed areas over at least 50% of its circumferential length. Moreover, the reference to the knurl "hills" in one band being subjected to a compressive stress while the knurl "hills" in the other band are subjected to a tensile stress suggest that the magnetic anisotropy results from the macroscopic topographic alteration of the shaft surface, i.e., the knurl, rather than from any residual stress created by a mechanical working process leading to the knurl. Thus, the patent appears to teach that magnetic anisotropy resulting from topographic alteration, rather than residual stress created magnetic anisotropy, is responsible for the sensed change in permeability. This teaching is entirely consistent with the formation of a knurl having relatively widely spaced apart troughs by a technique, such as machining or photoetching, which imparts no residual stress created anisotropy to the bands. A torque measuring device exclusively or substantially dependent upon topographic alteration possesses too little anisotropic preconditioning in the bands to provide a practically useful sensitivity. USSR Certificate No. 838,448 also discloses a magnetoelastic torque transducer having two spaced-apart circumferential bands on a shaft, circumferential excitation coils and circumferential measuring coils surrounding and overlying the bands. In this transducer the bands are formed by creating a knurl in the shaft surface with the troughs of the knurl at ±45° angles to the shaft axis so that the troughs in one band are orthogonal to the troughs in the other band. The knurls are carefully formed by an undisclosed method which ensures the presence of substantial unstressed surface sections between adjacent troughs so that the magnetic permeability of the troughs is different from the magnetic permeability of the unstressed areas therebetween. Inasmuch as the trough width-to-pitch ratio corresponds to the stressed to unstressed area ratio and the desired ratio appears to be 0.3, there is no circumferential region in either band which is intentionally stressed over more than 30% of its circumferential length. This very minimal stress anisotropic preconditioning is believed to be too small to provide a consistent transducer sensitivity, as measured by the electronic signal output of the measuring coils and their associated circuitry, for economical commercial utilization.

Notwithstanding their many shortcomings in forming sensitive and practical bands of magnetic anisotropy on a torqued shaft, the efforts evidenced in the Harada et al, Sasada et al, Mohri and Yamasaki et al articles and the USSR certificates represent significant advances over the earlier work of Beth and Meeks, Dahle and Scoppe in recognizing that a pair of axially spaced-apart, circumferential bands of symmetrical, helically directed anisotropy permits averaging axial permeability differences over the entire circumferential surface. This is notably simpler than attempting to average helical permeability differences sensed along the principal stress axis, as had earlier been suggested. Moreover, neither rotational velocity nor radial eccentricity significantly influence the permeability sensed in this manner. Nevertheless, these efforts to perfect means of attachment of magnetoelastically optimized material to the surface of the torqued member introduces unacceptable limitations in the resulting torque sensor. The application to the shaft of adhesively affixed amorphous ribbons suffers from significant drawbacks, such as the methods used to conform the ribbons to the shaft, the properties of the adhesive and the functional properties of the amorphous material, which make such ribbons impractical for commercial implementation. The use of rigidly affixed sleeves as taught by Scoppe and, more recently, in U.S. Pat. No. 4,506,554—Blomkvist et al, is unsuitable for practical applications due to the higher costs involved as well as the stresses created by high temperature welding and/or the uncertainties in magnetic and mechanical properties created by subsequent annealing. Likewise, reliance upon shape anisotropy or predominantly unstressed regions to create stress anisotropy present significant problems which make such techniques impractical for commercial implementation.

It is, therefore, apparent that despite the many advances in torque transducer technology, there still exists a need for a magnetoelastic torque transducer which is significantly more economical than previous torque transducers, allowing use in many applications for which such transducers were not heretofore either economically or environmentally viable, and which is applicable to small as well as large diameter shafts, whether stationary or rotating at any practical speed.

Disclosure of the Invention

In accordance with one broad aspect of the present invention there is provided a magnetoelastic torque transducer for providing an electrical signal indicative of the torque applied to a member in which a ferromagnetic and magnetostrictive region of the torqued member serves as a part of the magnetic sensing circuit of the transducer by providing at the surface of said region a pair of axially spaced-apart annular bands endowed with residual stress created, respectively symmetrical, left and right hand helically directed magnetic anisotropy of relatively large magnitude, which anisotropy overwhelms and/or renders negligible or insignificant any random anisotropy in the member as a result of internal stresses due to mechanical working, inhomogeneities, crystal orientation, and the like.

In another aspect of the present invention there is provided a magnetoelastic torque transducer for providing an electrical signal indicative of the torque applied to a member in which a thermally hardened ferromagnetic, magnetostrictive region of the torqued member or a thermally hardened ferromagnetic, magnetostrictive means rigidly affixed to or associated with the surface of said torqued member serves as a part of the magnetic sensing circuit of the transducer by providing at the surface of said thermally hardened region or means a pair of axially spaced-apart annular bands endowed with residual stress created, respectively symmetrical, left and right hand helically directed magnetic anisotropy of relatively large magnitude, which anisotropy overwhelms and/or renders negligible or insignificant any random anisotropy in the member as a result of internal stresses due to mechanical working, inhomogeneties, crystal orientation, and the like. As used herein, the term "thermally hardened" means heat treated at elevated temperatures above about 800° C., e.g., by annealing followed by quenching or by case hardening at high temperatures in a carburizing atmosphere followed by quenching, to impart desirable mechanical properties, e.g., hardness and strength, to the material of which the member, region or means is formed.

In accordance with another aspect of the present invention, there is provided a magnetoelastic torque transducer for providing an electrical signal indicative of the torque applied to a member, said member having a ferromagnetic and magnetostrictive region, said transducer comprising a pair of axially spaced-apart annular bands defined within said region, said bands having, at least at the surface of said member, respectively symmetrical right and left hand helically directed residual stress created magnetic anisotropy, each said band having at least one circumferential region which is free of residually unstressed areas, i.e., said at least one circumferential region is residually stressed, over at least 50% of its circumferential length; means for applying a cyclically time varying, e.g., alternating. magnetic field to said bands; means for sensing the change in permeability of said bands caused by said applied torque; and means for converting said sensed change in permeability to an electrical signal indicative of the magnitude of the torque applied to said member. In a preferred aspect, the ferromagnetic and magnetostrictive region is formed of an iron-nickel martensite hardenable steel, such as a nickel maraging steel, or a thermally hardened steel alloy characterized by a substantially isotropic magnetostriction having an absolute value of at least 5 ppm and including from 0.05 to 0.75 percent by weight carbon and sufficient of one or more elements selected from Ni, Cr, Co, Ti, Al, Mn, Mo, Cu and B to raise the alloy magnetostriction to at least 5 ppm absolute.

In accordance with another aspect, the present invention contemplates a magnetoelastic torque transducer for providing an electrical signal indicative of the torque applied to a member, including ferromagnetic, magnetostrictive means rigidly affixed to, associated with or forming a part of the surface of said torqued m ember for altering in magnetic permeability in response to the application of torque to said member, means for applying a magnetic field to said ferromagnetic, magnetostrictive means, means for sensing the change in permeability caused by said applied torque and means for converting said sensed change in permeability to an electrical signal indicative of the magnitude of the torque applied to said member, the ferromagnetic, magnetostrictive means being formed of an iron-nickel martensite hardenable steel, such as a nickel maraging steel, or a thermally hardened steel alloy characterized by a substantially isotropic magnetostriction having an absolute value of at least 5 ppm and including from 0.05 to 0.75 percent by weight carbon and sufficient of one or more elements selected from Ni, Cr, Co., Ti, Al, Mn, Mo, Cu and B to raise the alloy magnetostriction to at least 5 ppm absolute.

In still another aspect of the present invention, there is provided a method of sensing the torque applied to a member having a ferromagnetic and magnetostrictive region, which includes the steps of endowing a pair of axially spaced-apart annular bands within said region with respectively symmetrical, right and left hand helically directed magnetic anisotropy, applying a cyclically time varying, e.g., alternating, magnetic field to said bands and sensing the permeability difference between said bands resulting from the application of torque to said member, the difference being indicative of the magnitude of the applied torque, the improvement which comprises forming said bands at the surface of said member and endowing said bands with magnetic anisotropy by instilling a residual stress distribution in each band which is sufficiently extensive that at least one circumferential region within each band is free of residually unstressed areas, i.e., said at least one circumferential region is residually stressed, over at least 50% of its circumferential length. In a preferred aspect of this method, the ferromagnetic and magnetostrictive region is formed of an iron-nickel martensite hardenable steel, such as a nickel maraging steel, or a thermally hardened steel alloy characterized by a substantially isotropic magnetostriction having an absolute value of at least 5 ppm and including from 0.05 to 0.75 percent by weight carbon and sufficient of one or more elements selected from Ni, Cr, Co., Ti, Al, Mn, Mo, Cu and B to raise the alloy magnetostriction to at least 5 ppm absolute.

In yet another aspect of the invention, there is provided a method of sensing the torque applied to a member having a ferromagnetic and magnetostrictive region which includes the steps of endowing said region with helically directed magnetic anisotropy by instilling a residual stress distribution in said region which is sufficiently extensive that at least one circumferential region within said ferromagnetic and magnetostrictive region is free of residually unstressed areas, i.e., said at least one circumferential region is residually stressed, over at least 50% of its circumferential length, applying a cyclically time varying, e.g., alternating, magnetic field to said ferromagnetic and magnetostrictive region and to an area of said member not so endowed, and sensing the permeability difference between said ferromagnetic and magnetostrictive region and said area resulting from the application of torque to said member, the difference being indicative of the magnitude of the applied torque. In a preferred aspect of this method, the ferromagnetic and magnetostrictive region is formed of an iron-nickel martensite hardenable steel, such as a nickel maraging steel, or a thermally hardened steel alloy characterized by a substantially isotropic magnetostriction having an absolute value of at least 5 ppm and including from 0.05 to 0.75 percent by weight carbon and sufficient of one or more elements selected from Ni, Cr, Co, Ti, Al, Mn, Mo, Cu and B to raise the alloy magnetostriction to at least 5 ppm absolute.

In still another aspect of the invention, there is provided a method of sensing the torque applied to a member having a ferromagnetic and magnetostrictive region in which the ferromagnetic and magnetostrictive region is thermally hardened prior to endowing said region with helically directed magnetic anisotropy.

In a further aspect of the present invention, there is provided a method for making a magnetoelastic torque transducer for providing an electrical signal indicative of the torque applied to a member comprising the steps of providing a member having a ferromagnetic and magnetostrictive region; thermally hardening said region; endowing said thermally hardened region with a pair of axially spaced-apart annular bands having respectively symmetrical, right and left hand helically directed residual stress created magnetic anisotropy, each said band having at least one circumferential region which is free of residually unstressed areas over at least 50% of its circumferential length; providing excitation means associated with said bands for applying a cyclically time varying, e.g., alternating, magnetic field to said bands; providing sensing means associated with said bands for sensing the change in permeability of said bands caused by said applied torque; and, providing means for converting said sensed change in permeability to an electrical signal indicative of the magnitude of the torque applied to said member.

Brief Description of the Drawings

The invention will be better understood from the following description taken in conjunction with the accompanying drawings in which.

Best Mode For Carrying Out The Invention

In accordance with the present invention there is provided a magnetoelastic torque transducer comprising (1) a torque carrying member at least the surface of which, in at least one complete circumferential region of suitable axial extent, is appropriately ferromagnetic and magnetostrictive; (2) two axially distinct circumferential bands within this region or one such band in each of two such regions that are endowed with respectively symmetrical, helically directed residual stress induced magnetic anisotropy such that, in the absence of torque, the magnetization tends to be oriented along a left-hand (LH) helix in one band and along an axially symmetrical right-hand (RH) helix in the other band; and (3) a magnetic discriminator device for detecting, without contacting the torqued member, differences in the response of the two bands to equal, axial magnetizing forces.

Figure 1:
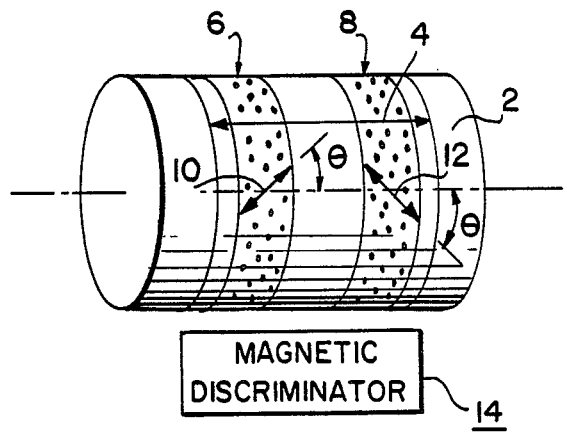
FIG. 1 is a perspective view of a magnetoelastic torque transducer in accordance with the present invention.

These features of the magnetoelastic torque transducer of the present invention will be better understood by reference to FIG. 1 in which a cylindrical shaft 2 formed of ferromagnetic and magnetostrictive material or, at least having a ferromagnetic and magnetostrictive region 4, is illustrated having a pair of axially spaced-apart circumferential or annular bands 6,8 endowed with respectively symmetrical, helically directed magnetic stress anisotropy in the angular directions $\pm \theta$ of the respective magnetic easy axes 10,12. A magnetic discriminator 14 is spaced from shaft 2 by a small radial space. In the absence of applied torque the magnetization within the bands 6,8 will respond symmetrically to the application of equal axial magnetizing forces. Longitudinal or axial components of the magnetization within these two bands remain identical, since $\cos \theta = \cos-(\theta)$ for all values of $\theta$, and the magnetic discriminator will therefore, detect no difference or zero. With the application of torque to shaft 2, the stress anisotropy arising therefrom combines asymmetrically with the quiescent anisotropies intentionally instilled in the bands and there is then a differing response of the two bands to equal axial magnetizing force. Since the stress anisotropy is a function of the direction and magnitude of the torque, the differential response of the two bands will be a monotonic function of the torque. The resulting differences in magnetic anisotropy in each of the bands is evidenced by the axial permeability of one band increasing and that of the other band decreasing. The difference in axial permeabilities of the two bands is used to sense the torque. A properly designed magnetic discriminator will detect detailed features of the differential response and provide an output signal that is an analog of the torque.

In accordance with the present invention, the torque carrying member is provided with two axially spaced-apart, distinct circumferential or annular bands in the ferromagnetic region of the member. There are no particular geometric, space, location or circumferential limitations on these bands, save only that they should be located on the same diameter member and close enough to one another to experience the same torque. The bands are intentionally endowed with respective symmetrical, helically directed, magnetic anisotropy caused by residual stress. Residual stress may be induced in a member in many different ways, as discussed more fully hereinbelow. However, all techniques have in common that they apply stress to the member beyond the elastic limit of at least its surface region such that, when the applied stress is released, in the absence of external forces, the member is unable to elastically return to an unstressed condition. Rather, residual stresses remain which, as is well known, give rise to magnetic anisotropy. Depending upon the technique utilized for applying stress, the angular direction of the tangential principal residual stress with the member's axis will vary between values greater than zero and less than 90°. Preferably, the angular direction of the residual stress and that of the resulting magnetic easy axes, is from 10° –80° and, most desirably, from 20° –60°.

As used herein, "residual stresses" are those stresses that exist in a body in the absence of external forces. Their distribution is such that the net forces and moments acting on various regions within the body sum to zero on the whole body. Thus, if any one region exerts net forces and/or torques on the remainder of the body then other regions must exert compensating forces and/or torques. The consequence of this requirement for residual stresses to establish self-compensating distributions is that the existence of any region experiencing a tensile stress implies the existence of a communicating region experiencing compressive stress. Residual stress is often classified by the size of the regions and the distances separating compensating regions as short range (SR) and long range (LR). SR stresses exist in regions from a few atoms up to a size comparable to microstructural features such as a single grain. LR stresses exist over dimensions from more than one grain to macroscopic features of the whole body.

The requirement of the present invention for a relatively coherent magnetic anisotropy over a major proportion of a circumferential band of macroscopic axial extent can be met with deliberately instilled, appropriately distributed LR stresses. In any one band the principal components of the residual stress at and near the surface are relatively uniform throughout the band and characterizable by a helical directionality. The stresses necessary to compensate for this surface stress should desirably lie radially inwards from the surface so as to be undetectable by surface magnetic sensing. This same distribution, but with an opposite handed, equi-angled helicity is instilled in the cooperative band.

It will be appreciated that inasmuch as the sensing of torque is primarily accomplished by sensing the change in permeability at the surface of the torqued member, it is at least at the surface of each band that there must be magnetic anisotropy created by residual stress. Hence, the limitation that the applied stress must be at least sufficient to exceed the elastic limit of the member at its surface. It will, of course, be appreciated that the application of an applied stress exceeding the minimum will, depending upon the magnitude of the applied stress, result in residual stress within the body of the member as well. For use herein, the term "surface" of the member means at the surface and within 0.010 inch thereof.

Any method of applying stress to a member to exceed the elastic limit thereof at the surface of the bands may be employed which produces uneven plastic deformation over the relevant cross-section of the member. Thus, the residual stress inducing method may be mechanical, thermal, or any other which is suitable. It is particularly desirable that the residual stress-inducing applied stress exceed the maximum expected applied stress when the member is torqued in use. This is to insure that torquing during use does not alter the residual stress pattern and, thus, the magnetic anisotropy within the bands. The residual stress induced in the respective bands should be substantially equal and symmetrical in order that axial permeability sensing, when equal axial magnetizing forces are applied to the member, will produce a "no difference" output in the untorqued condition and equal but opposite output as a result of the application of equal clockwise (CW) and counterclockwise (CCW) torques.

The method chosen to apply stress to a member beyond the elastic limit thereof in order to create residual stress is largely a function of the member's size, shape, material and intended application. The method may induce continuous and substantially equal residual stresses over the entire surface of the band, i.e., around the entire band circumference and along its entire axial length. Alternatively, the method may induce a residual stress pattern within each band which includes both stressed and unstressed areas. Such a pattern, however, is subject to the important limitation that each band must have at least one continuous circumferential region which is free of unstressed area s over at least 50% of its circumferential length, desirably over at least 80% of its circumferential length. In a particularly preferred configuration, each band would have at least one continuous circumferential region which is free of unstressed areas over its entire circumferential length. As a general matter, it is particularly desirable to maximize the amount of shaft surface which is intentionally stressed in order to endow as much of the surface as is possible with relatively large magnitude controlled magnetic anisotropy. This leaves as little of the shaft surface as possible subject only to the random anisotropies created during shaft manufacture, due to internal stresses and resulting from crystal orientation. It should be appreciated that the problems associated with random anisotropy inherent in using the shaft itself as an operative element, i.e., the sensing region, of the magnetic circuit of the torque sensor are overcome, in accordance with the present invention, by replacing and/or overwhelming the random anisotropy with relatively large magnitude intentionally created residual stress induced anisotropy. For obvious reasons, the greater the intentionally induced anisotropy, the less significant is any residual random anisotropy.

As used hereinbefore and hereinafter, the term "circumferential region" means the locus of points defining the intersection of (1) a plane passing perpendicular to the member's axis and (2) the surface of the member, as hereinbefore defined. Where the member is a cylindrical shaft, the circumferential region is a circle defining the intersection of the cylindrical surface with a plane perpendicular to the shaft axis, and such a circle has a circumference or circumferential length. Stated otherwise, if each element of the member's surface comprising the circumferential region were examined, it would be seen that each such element was either stressed or unstressed. In order to form a commercially functional torque sensor having broad applicability, particularly in small diameter shaft applications, which exhibits acceptable and commercially reproducible sensitivity, linearity and output signal strength, it has been found that at least 50% of these elements must have been stressed beyond their elastic limit and, therefore, must remain residually stressed after the applied stress is removed.

The range of methods by which torque carrying members can be endowed with the desired bands containing residual stress instilled helically directed magnetic easy axes, i.e., directions in which magnetization is easiest, is virtually endless. From the point of view of transducer performance the most important consideration is the adequacy of the resulting anisotropy, i.e., the band anisotropy created must be at least of comparable magnitude to the stress anisotropy contributed by the applied torque. From the point of view of compatibility with the device in which the transducer is installed, the compelling consideration is consequential effects on the member's prime function. Other important considerations in selecting a method are practicality and economics. Examples of suitable methods for imprinting residual stress induced magnetically directional characteristics on, i.e., at the surface of, a torque carrying member include, but are not limited to, torsional overstrain; knurling; grinding; mechanical scribing; directed or masked shot peening or sand blasting; roll crushing; appropriate chemical means; selective heat treatments, e.g., induction, torch, thermal print head, laser scribing.

Of the foregoing, the creation of areas of residual stress by torsional overstrain has been found to be a simple, economical and effective method for small diameter shafts. It is particularly desirable because it neither distorts nor interrupts the surface of the shaft and is, therefore, compatible with virtually any application. However, the manner of applying torsional overstrain, e.g., by twisting both sides of a centrally restrained region, makes it impractical for and inapplicable to large diameter shafts formed of high elastic limit materials. Knurling is a desirable manner of inducing residual stress in a shaft of virtually any diameter. With knurling, the exact location of the bands, their axial extent, separation and location can be closely controlled. In addition, knurling allows relatively simple control of the helix angles of the easy axes. Very importantly, knurling permits predetermination of the salient features of the knurl itself, such as pitch, depth and cross-sectional shape and, thereby, allows control of the residual stress induced. It should be appreciated that, in accordance with the present invention, enough of the surface of each band must be stressed that there exists within each band at least one continuous circumferential region which is free of unstressed areas over at least 50% of its circumferential length. Not all knurling is this extensive and care must be taken to select a knurl and a method for applying the knurl which achieves this objective. Inasmuch as knurling disrupts the surface of the shaft in order to form the knurl thereon, a knurled band is endowed with shape anisotropy as well as residual stress anisotropy. If it is desired, for example, for compatibility of the knurled shaft with an intended application, the gross shape features of the knurl may be ground off the shaft to leave only magnetic anisotropy caused by residual stress. Of course, knurling is not without its substantial shortcomings and, as will be seen hereinafter, is limited in its application to alloys having particular properties. Other forms of cold working, with or without surface deformation, such as grinding, likewise create residual stress and associated magnetic anisotropy and are advantageous forming processes in the manufacture of torque sensors in accordance with the present invention. In addition, more sophisticated methods, such as electron beam and laser scribing as well as selective heat treatment can provide the desired anisotropy with less mutilation of the shaft surface than most mechanical cold working methods. Moreover, these methods offer the opportunity of very close control of the induced residual stresses by adjustment of the power density and intensity of the beam and/or the thermal gradients.

Figure 7:
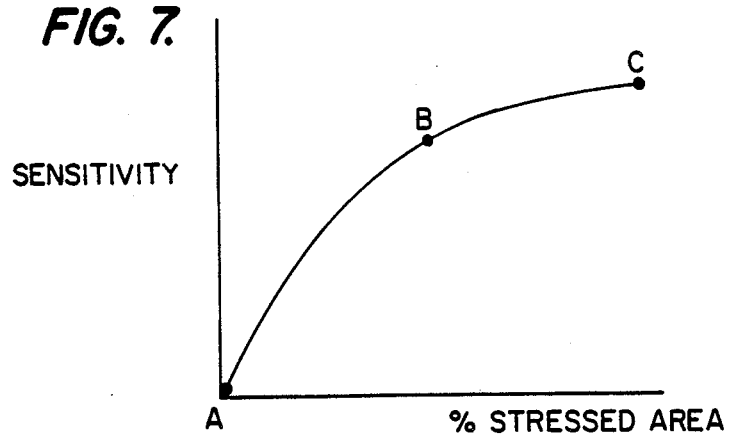
FIG. 7 is a graphical representation of the general relationship between torque transducer sensitivity and residual stress loading along the circumferential length of a circumferential region of the bands of a transducer of the present invention.

Whatever method may be selected for creating residual stress within the bands, it should be appreciated that the relationship between the percent of stressed areas along the circumferential length of a circumferential region within each band ("% stressed areas") and sensitivity (in millivolts/N-M) is one wherein the sensitivity increases with increasing "% stressed areas". A plot of these parameters yields a curve which has its greatest slope at the lower values of "% stressed areas" and which has a decreasing slope at the higher values of "% stressed areas", up to 100%, at which point the sensitivity is greatest and the slope is close to zero. The precise shape of the curve, its slope for any particular value of "% stressed areas", its initial rate of ascent and the point at which the rate of ascent decreases and the curve levels off are all functions of the material of the bands and the manner in which the stress is applied. A typical curve is shown in FIG. 7. At "A", there is no residual stress along the circumferential length of the circumferential region. At "C", 100% of the circumferential length of the circumferential region is subjected to residual stress. "B" represents the approximate point on the curve at which sensitivity begins to level off, i.e., becomes less responsive to "% stressed areas," a point which is both material and method dependent.

Ideally, torque sensor operation at 100% residual stress, i.e., at "C" on the curve, is best because the rate of change of sensitivity is minimized and the 100% stressed condition is generally easiest to attain with most methods. As a practical matter, it is difficult to control the residual stress inducing method to achieve a value for desired "% stressed area" which is less than 100%. However, practical production problems aside, acceptable torque sensors can be made which operate at sensitivity levels corresponding to less than 100% residual stress along the length of a circumferential region of the bands.

Torque sensors cannot economically and reproducibly be made to operate in the ascending portion AB along the curve in FIG. 7 since, in that portion, the sensitivity is extremely responsive to "% stressed areas". This means that even small changes in "% stressed areas" causes relatively large changes in sensitivity. From a practical, commercial standpoint, mass produced torque sensors must have a known and reproducible sensitivity. It would be unrealistic to have to individually calibrate each one. However, even normal production inconsistencies will cause small "% stressed areas" changes which will result, in the AB region of the curve, in large sensitivity differences among sensors. Therefore, commercially useful torque sensors have to operate along a flatter portion of the curve, where the slope is closer to zero. Operating in the BC portion of the curve appears to be an acceptable compromise. It is preferred, for most materials and residual stress inducing methods, that the point represented by "B" exceed at least 50%, preferably at least 80%, stressed areas along the circumferential length of a circumferential region. This is in recognition of the fact that the minimum acceptable residual stress loading of a circumferential region is both material and process dependent and that it is generally most desirable to be as close to 100% stress loading as is practical.

Figure 8:
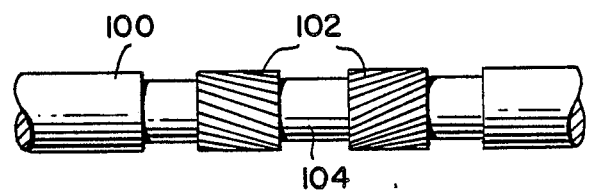
FIG. 8 is an elevational view of a test piece used in torque, transducer sensitivity testing.

To demonstrate the applicability of the foregoing in fabricating an operable torque sensor, with reference to FIG. 8, a 0.25 inch OD cylindrical shaft 100 was formed with two shoulders 102 of equal axial length spaced apart by a reduced diameter shaft portion 104 of 0.215 inch OD. The shaft was formed of a nickel maraging steel commercially available as Unimar 300K from Universal-Cyclops Specialty Steel Division, Cyclops Corporation of Pittsburgh, Pa. and was pre-annealed at 813° C. in hydrogen to relieve internal stresses. Each shoulder 102 was carefully knurled using a pair of identical ⅜ inch OD, ⅜ inch long knurling rollers having 48 teeth around their circumference. The shoulders were brought into contact with the knurling rollers in a controlled manner to form symmetrical knurls on each shoulder at angles of ± 30° to the shaft axis. Careful control of the infeed of the tool relative to the shoulders allowed the axial width and depth of each knurl trough to be controlled. The "% stressed areas" along the circumferential length of a circumferential region of each knurled shoulder was determined by assuming that the knurl trough was the only stressed area on the shoulder and that the shoulder surface between troughs was unstressed by the knurling operation; by measuring the trough width and chordal knurl pitch and converting the chordal pitch to circumferential pitch; and by calculating the trough width to circumferential pitch ratio, which ratio when multiplied by 100 represented the desired "% stressed areas" value. The shaft prepared in this manner was affixed to a lever arm which permitted 10-one pound weights to be suspended from cables at each end of the arm. The lever arm was so dimensioned that addition or removal of a single one pound weight from either side represented a torque change on the shaft of 0.5 N-M. By appropriate shifting of the weights, the torque on the shaft could be altered in both magnitude and direction.

Figure 9:
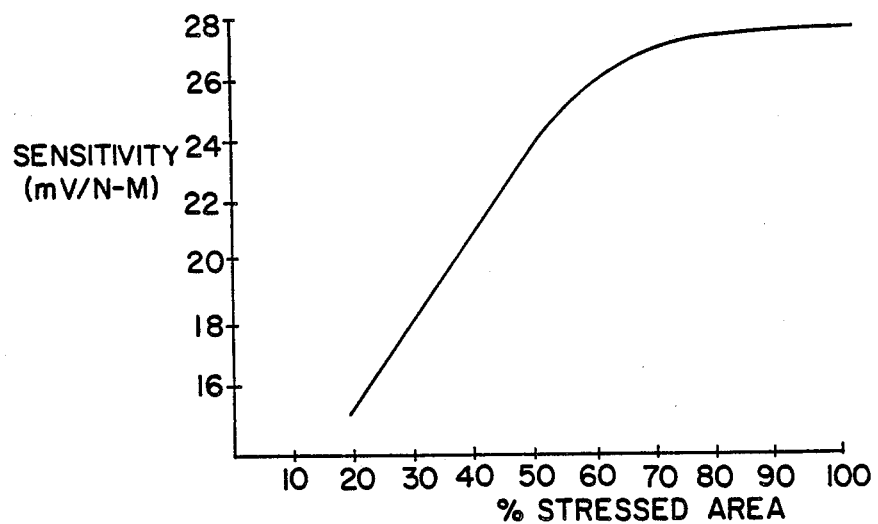
FIG. 9 is a graphical illustration, as in FIG. 7, of the sensitivity vs. residual stress loading relationship for a transducer of the present invention wherein the bands thereof were endowed with residual stress induced magnetic anisotropy by a controlled knurling technique.

FIG. 9 graphically illustrates the relationship between "% stressed areas" and sensitivity for a shaft prepared as described hereinabove. It can be seen that the curve ascends rapidly up to about 60% stress loading and then appears to level off rather rapidly thereafter. This is because there is believed to be a greater correlation at lower "% stressed area" values between the trough width to circumferential pitch ratio and the actual percentage of stressed areas along the circumferential length of a circumferential region of the shaft. As the width and depth of the knurling trough increases it becomes apparent that the shoulder surface between troughs, at least in the vicinity of the trough edges, becomes slightly deformed and, more than likely, residually stressed. Therefore, the point on the curve at which 100% stress loading in a circumferential region is actually achieved is somewhat less than the calculated 100% value, accounting for the rapid flattening of the curve at the higher "% stressed areas" portions thereof. This suggests that, with many processes, such as knurling, the 100% stress loading point can be achieved with less than 100% topographic disruption. It will be appreciated in this connection, that each method of inducing residual stress in a shaft will produce its own distinctive curve of "% stressed areas" vs. sensitivity, although it is believed that each curve will have the same general characteristics as appear in FIGS. 7 and 9.

In accordance with the foregoing, it can be seen that in the absence of applied torque, the application to the bands of equal axial magnetizing forces causes the bands to respond symmetrically and the sensing means associated with the bands detect no difference in response. When torque is applied, the principal stresses associated with the applied torque combine with the residual stresses in the bands in such a manner that the resultant stresses in the two bands are different from each other. As a result, the magnetic permeabilities are different and the emf induced in the sensing means associated with each band reflect that difference. The magnitude of the difference is proportional to the magnitude of the applied torque. Thus, the instant system senses a differential magnetoelastic response to the principal stresses associated with the applied torque between two circumferential bands. The significance of this is that sensing in this manner amounts to sensing the response averaged over the entire circumference of the band. In this manner, sensitivity to surface inhomogenity, position and rotational velocity are avoided.

This sensing of magnetic permeability changes due to applied torque can be accomplished in many ways, as is disclosed in the prior art. See, for example, the aforementioned article of Harada et al and U.S. Pat. No. 4,506,554. Functionally, the magnetic discriminator is merely a probe for assessing any differential magnetoelastic response to applied torque between the two bands. In general, it functions by imposing equal cyclically time varying magnetizing forces on both bands and sensing any differences in their resulting magnetization. The magnetizing forces may come from electrical currents, permanent magnets, or both. Resulting magnetization may be sensed through its divergence, either by the resulting flux or its time rate of change. The transducer function is completed by the electrical circuitry which delivers an electrical signal that is an analog of the torque.

Figure 2:
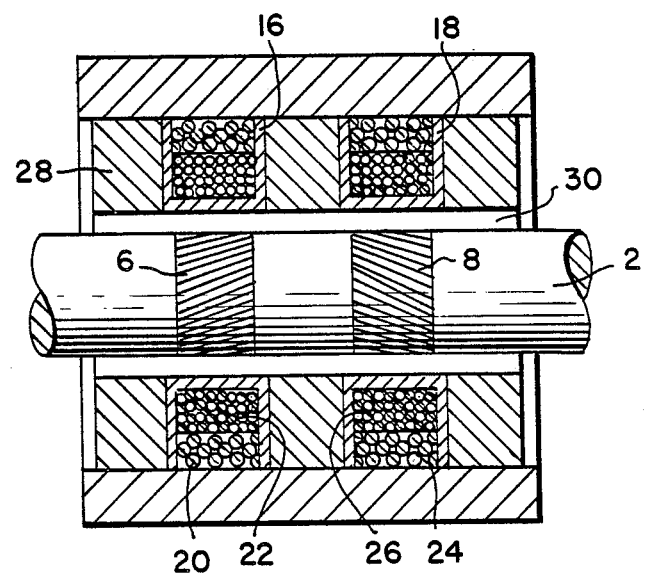
FIG. 2 is a sectional view of a magnetoelastic torque transducer in accordance with the present invention illustrating one form of magnetic discriminator useful therewith.
Figure 3:
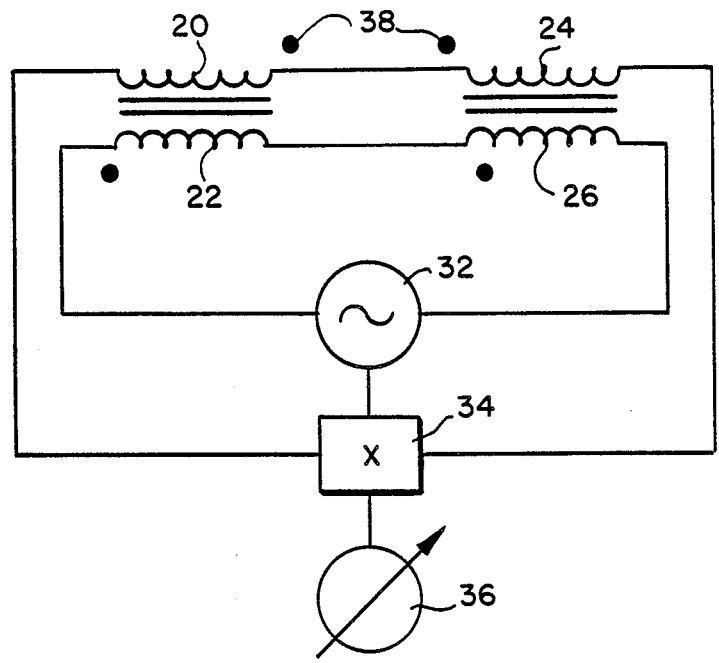
FIG. 3 is a circuit diagram showing the circuitry associated with the magnetic discriminator of FIG. 2.

One method of supplying the magnetization forces and for measuring the resulting difference signal from the sensing coil is shown in FIGS. 2 and 3. Referring to FIG. 2, it can be seen that the bands 6,8 are surrounded by bobbins 16,18 which are concentric with shaft 2. Mounted on bobbins 16,18 are a pair of coils 20,22 and 24,26 of which 22 and 26 are excitation or magnetizing coils connected in series and driven by alternating current and 20 and 24 are oppositely connected sensing coils for sensing the difference between the fluxes of the two bands. A ferrite material core 28 is optionally provided as a generally E-shaped solid of revolution. Circumferential gaps 30 between the shaft and the E-shape core are desirably maintained as small and uniform as is practical to maintain the shaft centered within the core. FIG. 3 shows that excitation or drive coils 22,26 are supplied in series from AC source 32 and the emf induced in the oppositely connected sensing coils 20,24 is phase sensitively rectified in the rectifier 34 and is displayed on voltage display instrument 36. Black dots 38 indicate the polarity of the coils.

Inasmuch as the stresses in the bands are symmetrical and equal when no torque is applied to shaft 2, under these conditions the output signal from the circuitry shown in FIG. 3 will be zero, regardless of the applied a.c. driving input. This is because the bands have equal magnetic permeability. Thus the voltages induced in the sensing coils are equal in magnitude and opposite in polarity and cancel each other. However, when a torque is applied to shaft 2, the respective bands will be subjected to tensile and compressive stresses, with a resulting increase of permeability and of the flux passing through one of the bands, and a resulting decrease of permeability and of the flux passing through the other of the bands. Thus, the voltage induced in one of the sensing coils will exceed the voltage induced in the other sensing coil and an output signal representing the difference between the induced voltages and proportional to the applied torque will be obtained. The signal is converted to a direct current voltage in the rectifier 34 and the polarity of the rectifier output will depend upon the direction, i.e., CW or CCW, of the applied torque. Generally, it has been found that in order to obtain linear, strong output signals, the a.c. driving current should advantageously be maintained in the range 10 to 400 milliamperes at excitation frequencies of 1 to 100 kHz.

Figure 4:
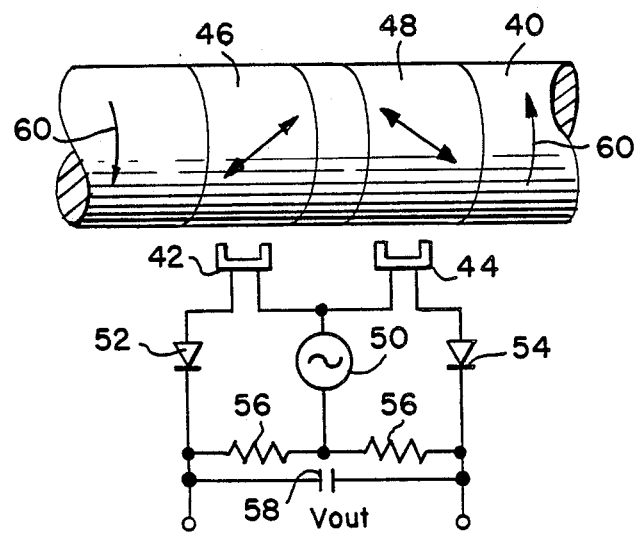
FIG. 4 is a schematic view of a magnetoelastic torque transducer in accordance with the present invention illustrating another form of magnetic discriminator, and its associated circuitry, useful therewith.

FIG. 4 illustrates another type of magnetic discriminator for sensing the permeability change of the bands upon application of a torque to the shaft. Magnetic heads 42,44 comprising a ferromagnetic core and a coil wound thereupon are provided in axial locations along shaft 40 which coincide with bands 46,48 and are magnetically coupled to the bands. The magnetic heads 42,44 are excited by high frequency power source 50 through diodes 52,54. With no torque applied to shaft 40, the magnetic permeability of the bands are equal. Therefore, the inductance levels of both magnetic heads are equal and opposite in polarity, and the net direct current output, $V_{out}$, is zero. When torque is applied to shaft 40, as shown by arrows 60, the magnetic permeability of one band increases while the permeability of the other decreases. Correspondingly, the inductance of one magnetic head increases while the inductance of the other decreases, with a resultant difference in excitation current between the heads. This difference in excitation current, passed via output resistors 56 and smoothing capacitor 58, produces a direct current output signal which has polarity and magnitude indicative of the magnitude and direction of the applied torque.

In accordance with one unique aspect of the present invention, as hereinbefore described, a shaft of suitable material is endowed in each of two proximate bands with symmetrical, left and right handed helical magnetic easy axes. At least in the region of the bands, and more commonly over its entire length the shaft is formed, at least at its surface, of a material which is ferromagnetic and magnetostrictive. The material must be ferromagnetic to assure the existence of magnetic domains and must be magnetostrictive in order that the orientation of the magnetization may be altered by the stresses associated with an applied torque. Many materials are both ferromagnetic and magnetostrictive. However, only those are desirable which also exhibit other desirable magnetic properties such as high permeability, low coercive force and low inherent magnetic anisotropy. In addition, desirable materials have high resistivity in order to minimize the presence of induced eddy currents as a result of the application of high frequency magnetic fields. Most importantly, favored materials must retain these favorable magnetic properties following the cold working and heat treating necessary to form them into suitable shafts having appropriately high strength and hardness for their intended use.

It is true that many high strength steel alloys are ferromagnetic and magnetostrictive. However, to varying degrees, the vast majority of these alloys experience a degradation in their magnetic properties as a result of the heat treating necessary to achieve suitable hardness and strength for the desired application. The most significant degradation is noted in those alloys hardened by carbon or carbides for which the conventional inverse relationship between mechanical hardness and magnetic softness appears to have a sound basis. However, the performance of even low carbon alloys such as AISI 1018 is found to significantly degrade with heat treating. The same is true for martensitic stainless steels, e.g., AISI 410, and highly alloyed steels, e.g., a 49Fe-49Co-2V alloy. It has been determined, in accordance with another unique aspect of the present invention, that the nickel maraging steels possess the unusual combination of superior mechanical properties and outstanding and thermally stable magnetic properties which give them a special suitability and make them particularly advantageous for use in all magnetoelastic torque transducers in which a magnetic field is applied to ferromagnetic, magnetostrictive means and the change in permeability caused by torque applied thereto is sensed to obtain an indication of the magnitude of the applied torque. This is the case whether the ferromagnetic, magnetostrictive means is affixed to, associated with or forms a part of the surface of the torqued member and whether or not the ferromagnetic, magnetostrictive means is endowed with bands of intentionally instilled magnetic anisotropy and irrespective of the number of bands which may be used.

The nickel maraging steels are, typically, extra-low-carbon, high nickel, iron-base alloys demonstrating an extraordinary combination of structural strength and fracture toughness in a material which is readily weldable and easy to heat-treat. They belong to a loosely knit family of iron-base alloys that attain their extraordinary strength characteristics upon annealing and during cooling, by transforming to an iron-nickel martensitic microstructure, and upon aging in the annealed or martensitic condition. Thus, the alloys are termed "maraging" because of the two major reactions involved in their strengthening— martensitizing and aging. However, these steels are unique due to their high nickel and extremely low carbon content, which permits formation of an outstandingly tough martensite that can be strengthened rapidly to extraordinarily high levels. Yield strengths up to and well beyond 300 ksi are available in these steels in the aged condition.

Typical nickel maraging steels are alloys comprising 12–25% Ni, 7–13% Co, 2.75–5.2% Mo, 0.15–2.0% Ti, 0.05–0.3% Al, up to 0.03% C, balance Fe and incidential amounts of other elements, such as Mn, Si, S, P, Cb. The most popular and practically significant maraging steels, at least at present, are the 18% Ni steels which can be aged to develop yield strengths of about 200 ksi, 250 ksi and 300 ksi. These particular alloys, referred to as 18Ni200, 18Ni250 and 18Ni300 grade maraging steels have typical compositions in the ranges 1–19% Ni, 7–9.5% Co, 3.0–5.2% Mo, 0.1–0.8% Ti, 0.05–0.15% Al, up to 0.03% C, balance Fe and incidential amounts of other elements. Typically, the 18% nickel maraging steels are heat treated by annealing at temperatures of 1500° F. and above for a sufficient time, e.g., one hour per inch of thickness, to dissolve precipitates, relieve internal stresses and assure complete transformation to austenite. Following air cooling, the 18% Ni steels are conventionally aged at 750–1100° F., desirably 900–950° F., for 3 to 10 hours, depending upon thickness, usually 3–6 hours. However, it has been found that satisfactory strength characteristics and superior magnetic characteristics can be attained in alloys aged for as little as 10 minutes.

Other well know n nickel maraging steels are cobalt-free 18% Ni maraging steels as well as cobalt-containing 25% Ni, 20% Ni and 12% Ni maraging steels. The 18% Ni-cobalt containing maraging steels are commercially available from a number of sources. Thus, such steels are obtainable under the trademarks VascoMax C-200, VascoMax C-250, VascoMax C-300 and VascoMax C-350 from Teledyne Vasco of Latrobe, Pa.; under the trademarks Marvac 250 and Marvac 300 from Latrobe Steel Company of Latrobe, Pa.; under the trademark Unimar 300K from Universal-Cyclops Specialty Steel Division, Cyclops Corporation of Pittsburgh, Pa.; and, under the trademark Almar 18-300 from Superior Tube of Norristown, Pa. The 18% Ni-cobalt free maraging steels are commercially available under the trademarks VascoMax T-200, VascoMax T-250 and VascoMax T-300 from Teledyne Vasco of Latrobe, Pa. Other high nickel steels which form an iron-nickel martensite phase exhibit mechanical and magnetic properties which are similar to those of the more conventional maraging steels and which are also substantially stable to temperature variations. Most notable among these is a nominally 9% Ni-4% Co alloy available from Teledyne Vasco having a typical composition, in percent by weight, of 9.84 Ni, 3.62 Co, 0.15 C, balance Fe. In addition, maraging steels of various other high nickel-cobalt compositions, e.g., 15% Ni-15% Co, are continuously being tested in efforts to optimize one or another or some combination of properties. Therefore, as used herein, the term "Ni maraging steel" refers to alloys of iron and nickel which contain from 9-25% nickel and which derive their strength characteristics from ironnickel martensite formation, as hereinbefore described.

In addition to their outstanding physical and strength characteristics, the nickel maraging steels have excellent magnetic properties which make them outstanding for use as the magnetic material in non-contact torque transducers. Thus, they have high and substantially isotropic magnetostriction, in the range of 25 ppm 15 ppm, and do not exhibit a Villari reversal; high electrical resistivity; low inherent magnetic anisotropies due to crystalline structure; high magnetic permeability; low coercive force, in the range 5-25 oersted; and, stability of magnetic properties with alloy chemistry. However, most important is that their magnetic properties are only modestly, yet favorably, affected by strengthening treatments—indeed, their magnetic properties improve with cold work and aging heat treatment. This characteristic distinguishes the nickel maraging steels from all other high strength alloys. Heretofore, it had been the conventional wisdom that the heat treatments needed to improve the mechanical and strength properties of steels were detrimental to their magnetic properties. For example, quench hardened steel alloys typically exhibit very low magnetic permeabilities and high coercive forces, a combination of unfortunate magnetic properties which materially decrease the sensitivity of such alloys to small magnetic fields and diminish or negate their usefulness in torque transducers such as are contemplated herein. This is demonstrably not the case with the nickel maraging steels. In accordance with the present invention it has been determined that nickel maraging steels get magnetically softer following cold work and the aging heat treatments to which they are conventionally subjected in order to develop their extraordinary high strength characteristics. For example, the coercive force of an 18% Ni maraging steel in fact decreases when aged at 900° F. for up to 10 hours. As a result the maraging steels can be advantageously used in their aged condition, i.e., in a condition where they exhibit maximum strength characteristics and substantially the same or improved magnetic characteristics.

Thus, the use of maraging steels as the magnetic material in a magnetoelastic torque sensor, particularly as the shaft material in a device whose torque is to be sensed, obviates virtually all of the objections heretofore made to using the device shaft as the magnetic member. The mechanical and strength properties of maraging steels satisfy the mechanical properties requirements for most all shaft applications while, at the same time, providing outstanding magnetic properties for its role in the torque sensor. Aging of the maraging steels provides the high strength and high hardness needed for the mechanical application without loss of magnetic permeability or increase in coercive force. Moreover, the conventional manner of heat treating maraging steel, including the initial solution anneal at temperatures in excess of 1500° F., relieves internal stresses due to mechanical working and most stresses due to inhomogeneities and crystal orientation, thus minimizing the amount of random magnetic anisotropy in a maraging steel shaft. When such heat treatment is combined with the creation, according to the present invention, of a pair of adjacent bands endowed with intentionally instilled magnetic stress anisotropy of a relatively large magnitude, e.g., by stressing the shaft beyond its elastic limits with applied stresses of a magnitude greater than the largest torque stresses anticipated during normal usage of the shaft, the contribution to total magnetic anisotropy of any random anisotropy in the shaft is indeed negligible.

It will be appreciated that the advantage of the nickel maraging steels in magnetoelastic torque transducers can be realized by forming the shaft of the desired nickel maraging steel, by forming a region of the shaft of the desired nickel maraging steel and locating the annular bands within this region, or by surfacing with a nickel maraging steel a shaft formed of an alloy having mechanical properties suitable for the intended function of the shaft, i.e., applying over at least one complete circumferential region of suitable axial extent of the shaft a surfacing alloy of the desired nickel maraging steel and locating the annular bands within this region. Inasmuch as magnetic permeability sensing in accordance with the present invention is fundamentally a surface phenomena, the surfacing process need apply a circumferential layer of thickness not exceeding about 0.015 inches. The surfacing process selected may advantageously be selected from among the many known additive processes, e.g., electroplating, metal spraying, sputtering, vacuum deposition, ion implanatation, and the like.

Figure 5:
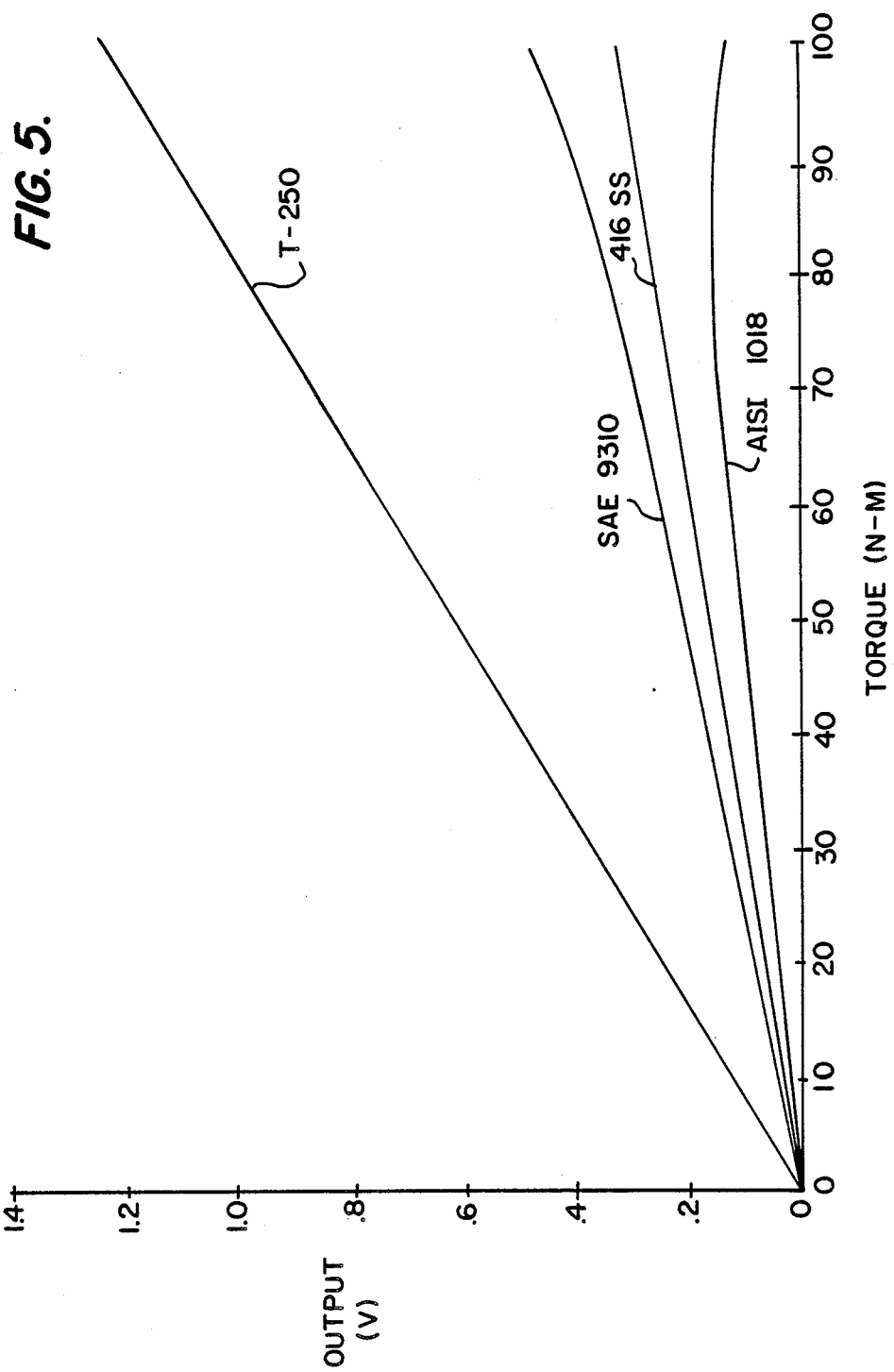
FIG. 5 is a graphical representation of the relationship between applied torque and output signal for several magnetoelastic torque transducers of the present invention.

In order to demonstrate the outstanding qualities of the maraging steels as the magnetic material in torque transducers of the present invention and to compare the performance of maraging steels with other high strength steels, a torque transducer was assembled using a 12.7 mm diameter cylindrical shaft having formed thereon a pair of axially spaced-apart bands endowed with helically symmetrical LH and RH magnetic easy axes. The bands each had an axial length of 12.7 mm and were separated by a 12.7 mm shaft segment. They were formed by knurling using a ¾-inch OD knurling tool having 48 teeth around the circumference, each tooth oriented at 30° to the shaft axis. The characteristics of this arrangement were sensed by positioning bobbins concentric with the shaft and axially aligned with the bands, each bobbin having a magnetizing and sensing coil mounted thereon. The magnetizing coils were connected in series and driven by an alternating current source having a 10 KHz frequency output and a 200 mA peak driving current. The emf induced in each of the sensing coils was separately rectified with the rectified outputs oppositely connected to produce a difference signal which was displayed on a voltage display instrument. Four shafts were employed, identical in all respects except they were each formed of different materials. The composition of each shaft is set forth in percent by weight hereinbelow:

T-250: 18.5 Ni; 3.0 Mo; 1.4 Ti; 0.10 Al; less than 0.03 C; no cobalt; balance Fe SAE 9310: .08–0.13 C; 0.45–0.65 Mn; 3–3.5 Ni; 1–1.4 Cr; 0.08–0.15 Mo; balance Fe 416 SS: 11.5–13.5 Cr; 0.5 max Ni; 0.15 max C; 1.0 max Mn; 1.0 max Si; balance Fe AISI 1018: 0.15–0.20 C; 0.6–0.9 Mn; 0.04 max P; 0.05 max S; balance Fe In a first series of runs, the T-250 nickel maraging steel shaft was used in the solution annealed, unaged condition as received from Teledyne Vasco. Likewise, the other shafts were also used in their aspurchased condition without further heat treatment. A known torque loading was applied to each shaft under test and the output voltage signal was recorded. The applied torque was increased from zero up to 100 newton-meters (N-M). FIG. 5 is a graph of applied torque versus output d.c. voltage for each shaft. It is apparent that the sensitivity of the T-250 shaft in terms of magnitude of output signal for a given torque loading was significantly greater than for the other shaft materials tested. In addition, the linearity of the output signal for the T-250 shaft was extremely good over the entire torque range. The other shaft materials appeared to be about equally insensitive, compared to the T-250 shaft, to applied torque. None produced as linear a signal as the T-250 shaft, although each produced a reasonably linear signal over most of the torque range.

Figure 6:
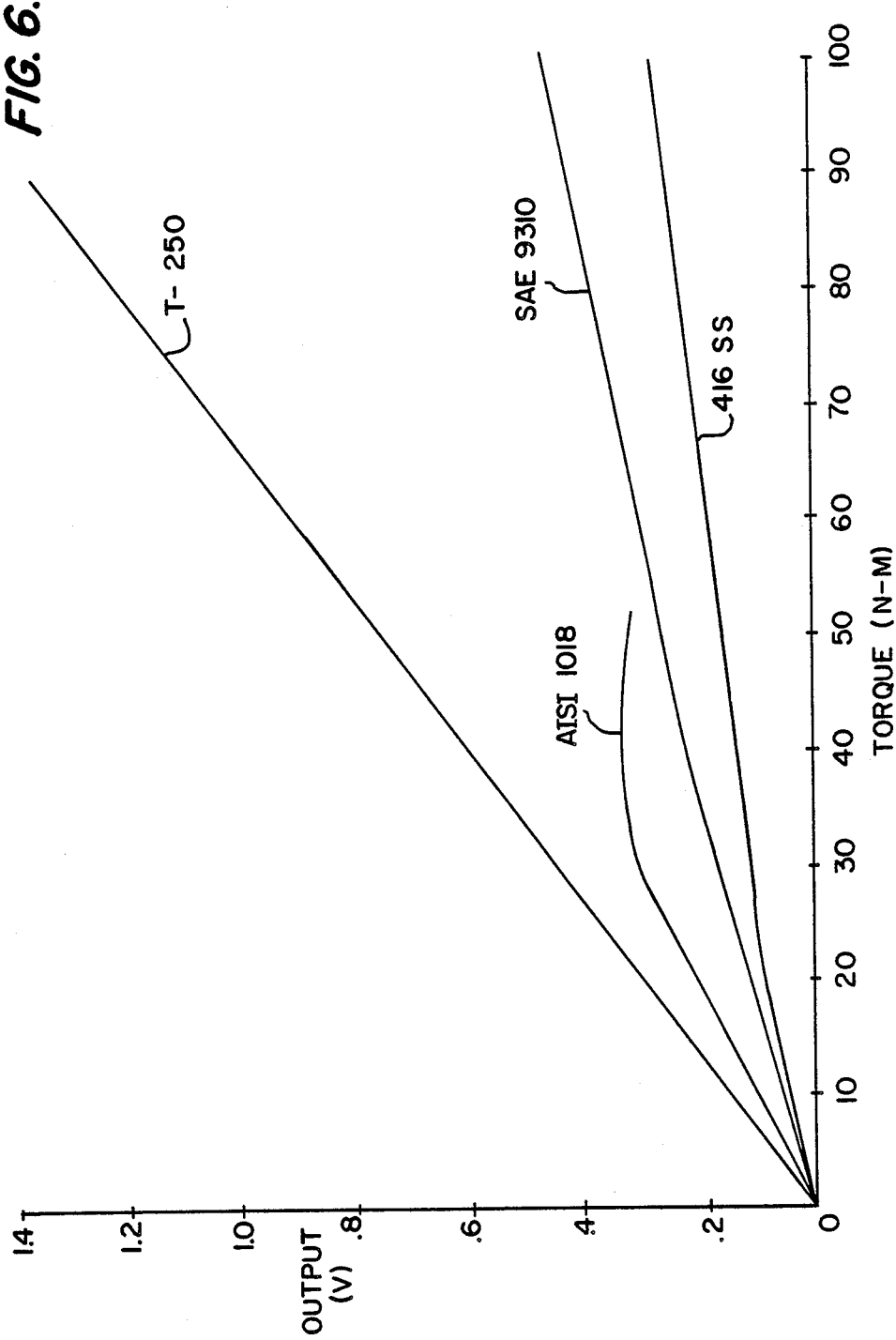
FIG. 6 is a graphical representation of the relationship between applied torque and output signal for the magnetoelastic torque transducers of FIG. 5 after the shafts thereof have been heat treated under identical conditions.

For the second series of runs, the T-250 nickel maraging steel shaft was aged at about 900° F. for 30 minutes to improve the strength and hardness of the shaft. For consistency of testing, the other shafts were heat treated in the same manner, after which each shaft was subjected to an applied torque from zero to 100 N-M and the output d.c. voltage recorded. FIG. 6 is a graph of applied torque versus output d.c. voltage for each shaft after heat treatment. It can be seen that once again the sensitivity of the T-250 shaft far exceeded the sensitivity of the other shafts and once again the T-250 output signal was linear over the entire torque range. By comparison with FIG. 5 for the T-250 shaft in the unaged condition it is apparent that aging measurably improved the sensitivity of the shaft, indicating an enhancement of the magnetic properties of the maraging steel with aging. By contrast, the sensitivity of the SAE 9310 shaft did not appear to improve with this heat treatment. Moreover, the linearity of the output signal clearly degraded, particularly at higher applied torques. The sensitivity of the AISI 1018 shaft significantly improved at low applied torques but the improvement began to abate at about 40 N-M and degraded thereafter. The linearity of the output signal for the aged AISI 1018 shaft was very poor. For the 416 SS shaft, the sensitivity at low applied torques improved with heat treatment but significantly worsened at higher applied torques. The linearity of the 416 SS output signal became worse with heat treatment. It is noteworthy that notwithstanding the mixed response of the output signal to applied torque, heat treatment adversely affected the mechanical and strength properties of the SAE 9310, 416SS and AISI 1018 shafts. For example, following heat treatment, an applied torque of only about 50 N-M exceeded the elastic limit of the AISI 1018 shaft and the shaft permanently twisted.

Moreover, the results reported in FIG. 6, although significant for effecting a comparison with the T-250 alloy, are somewhat deceptive in terms of evaluating the actual usefulness of these other alloys in the shafts of magnetoelastic torque transducers. This is because the heat treatment to which these alloy s were subjected was aging at 900° F. for 30 minutes, the same heat treatment used for the T-250 alloy. However, such a heat treatment is not an effective heat treatment for improving the mechanical and strength properties of these steel alloys. Typically, for example, quench hardening of 416SS requires heating to above 950° C. and case hardening of SAE 9310 requires heating to above 900° C. At these high temperatures, a large proportion of the residual stress created within the bands by the knurling process and the resulting residual stress-created magnetic anisotropy is removed, leaving a mechanically hard but magnetically inferior alloy which is essentially useless as the magnetostrictive, ferromagnetic shaft element in the magnetoelastic torque transducers of the present invention. In addition, it has been noted that certain thermal hardening treatments, such as case hardening SAE 9310, tend to warp the shaft which renders the shaft useless, without further processing, for its intended as well as any transducer purpose. Unfortunately, the necessary further processing to straighten the warped shaft, such as machining, will alter the intentionally instilled magnetic anisotropies in the bands, thus effectively undoing the careful magnetic preconditioning of the shaft. As will become clearer from the discussion which follows, the better procedure for preparing a magnetoelastic torque transducer in accordance with the present invention from a non-Ni maraging steel alloy such as SAE 9310 is to first thermally harden the alloy, as by case hardening, and then machine the resulting shaft as needed to straighten it. Thereafter, grinding or other processing of the hardened alloy can be accomplished to provide bands endowed with residual stress created magnetic anisotropy. One advantage of the use of grinding is that it removes any surface anisotropies instilled by the straightening process and substitutes the desired residual stress-created anisotropies, all without macroscopic topographic alteration of the shaft surface.

FIGS. 5 and 6 graphically illustrate the signal response to applied torque using a relatively low, 10 kHz, a.c. excitation frequency. It has been found that the output signal is directly proportional to and increases approximately linearly with a.c. frequency. Tests show that at 20 kHz, for example, a doubling of the output d.c. voltage signal is obtained. Depending upon the circuitry employed, a.c. frequencies in the range 1–100 kHz can advantageously be used to drive torque transducers of the present invention. Preferably, frequencies of 10–30 kHz, just above the human audible range, are used in order to avoid whistling. Most desirably, the frequency is adjusted to about 20 kHz. Like its response to frequency, the output d.c. signal also appears to be directly proportional to, more specifically to vary sigmoidally with, the drive current which, depending upon the frequency, can usefully be in the range 10–400 mA (peak). Generally, sufficient current is used to obtain a good signal at the chosen frequency and, desirably, to adjust the signal hysteresis to zero over the entire applied torque range.

It is interesting to note that the sensitivity of a nickel maraging steel shaft is markedly better than the sensitivities reported by workers employing nonmagnetic shafts and adhesively affixing amorphous ribbons thereto. From FIG. 6, it can be seen that according to the present invention an aged T-250 nickel maraging steel shaft transducer, having a shaft diameter of 12.7 mm, produces an output d.c. signal of 0.9 volts at an applied torque of 60 N-M using an a.c. frequency of 10 kHz and an exciting current of 200 mA and employing exciting coils having 100 turns each and sensing coils having 500 turns each, a sensitivity of 0.015 V/N-M. By comparison, Sasada et al, in the paper "Noncontact Torque Sensor", presented at the 11th Annual IEEE Industrial Electronics Society Conference (Nov. 18–22, 1985) reports, for an amorphous ribbon torque sensor, an output d.c. signal of 35 mV at an applied torque of 10 N-M using an a.c. frequency of 20 kHz, an exciting current of 120 mA, exciting coils having 220 turns each and sensing coils having 80 turns each and a shaft diameter of 12 mm. Inasmuch as sensitivity is directly proportional to a.c. frequency, exciting current and number of turns on the exciting and sensing coils and inversely proportional to the cube of the shaft diameter, the Sasada et al sensitivity corrected to an equivalent basis as that shown in FIG. 6 hereof is 0.007 V/N-M. In other words, the torque transducer of the present invention is more than twice as sensitive as the amorphous ribbon torque sensor of Sasada et al.

Although it might appear from the foregoing discussion of the absolute and relative advantages of the nickel maraging steels that more conventional steel alloys are not useful in accordance with the present invention, this is manifestly not the case. It is, of course, true that all but the nickel maraging steels appear to suffer from the very significant drawback that thermal hardening, as by high temperature heating followed by quenching to achieve through hardening or high temperature heating in a carburizing atmosphere to achieve case hardening, thermally relieves the intentionally created residual stresses within the bands with the result that the large magnitude residual stress-created magnetic anisotropies within the bands, which are essential to the magnetoelastic torque transducers of the present invention, are in large part removed. However, it is clear from the data reported in FIG. 5 that each of the SAE 9310, 416SS and AISI 1018 alloys tested exhibited a sensitivity, in terms of magnitude of output signal for a given torque loading, within the useful range and each produced a reasonably linear signal over most of the torque range. Thus, it is not their inherent magnetic characteristics which disqualify these alloys from the type of transducer use exemplified by the data reported in FIG. 5, but rather that the thermal hardening process necessary to give an alloy the mechanical and strength characteristics it needs to perform its intended mechanical function appears to destroy the favorable magnetic properties of these alloys. In this connection it will be appreciated that in most applications for the torque transducers of the present invention, the mechanical and strength characteristics requirements for the rotating shafts dictated by the operating characteristics of the equipment in which they are installed necessitate the use of steel alloys in their hardened condition.

In order to demonstrate this unfortunate adverse relationship between the mechanical and magnetic properties of steel alloys, ⅜ inch diameter shafts of 410 SS and 502 SS having the following compositions in percent by weight were employed:

410 SS: 12.3 Cr; 0.2 Ni; 0.08 C; 0.9 Mn; 0.4 Si; 0.4 Mo; balance Fe

502 SS: 5.0 Cr; 0.06 C; 0.8 Mn; 0.4 Si; 0.5 Mo; balance Fe

The shafts were processed by annealing and torsionally overstraining, by twisting both ends of a centrally restrained shaft, to provide a pair of adjacent bands having respectively symmetrical right and left hand helically directed residual stress-created magnetic anisotropy. Thereafter, while still in their mechanically soft conditions, known torque loadings were applied to each processed shaft and the output voltage recorded. In each case the shafts displayed a good response to the torque loadings, the 410 SS shaft exhibiting an output sensitivity of 600 mV over a torque loading range of approximately 2 newton-meters and good linearity. The 502 SS shaft was not quite as good, exhibiting, over the same torque loading range, an output sensitivity of only 95 mV and a less desirable linearity. Nevertheless, this rough test for transducer function confirmed the FIG. 5 results that at least certain steel alloys possess the potential for such function. When the tests were completed, the 410 SS and 502 SS shafts were subjected to a hardening heat treatment at about 950° C. followed by quenching. When the torque loading tests were repeated on the hardened shafts it was noted that the output sensitivity over the same torque loading range had dropped to less than 5 mV, confirming, as expected, that the hardening heat treatment had destroyed the desirable magnetic properties intentionally imparted to the shafts by the pre-testing processing.

In fact, notwithstanding the foregoing disability of steel alloys, it has been determined that thermally hardenable steel alloys, as more fully and clearly defined hereinafter, can be made to function very effectively in the magnetoelastic torque transducers of the present invention. This can be accomplished with such alloys by creating the residual stress within the bands only after the alloys have been appropriately thermally treated to bring their hardness and strength characteristics up to the levels required by the intended usage of the alloys. The subsequent or post-hardening creation of residual stress to endow the bands with the desired magnetic anisotropy does not adversely alter the mechanical or strength properties of the alloys. However, preparing a steel alloy shaft in this manner does impose strict limitations on the type of process which may be used to create the residual stresses. Certain processes, like knurling which requires plastic flow and torsional overtwisting, require a soft alloy and cannot be practiced on already hardened alloys. Efforts to knurl hardened steel alloys has resulted in microcracks and fissures and other undesirable topographic devastation to the alloy shaft. Efforts to twist small diameter hardened steel alloys has invariably resulted in snapping of the shafts. Thus, in accordance with the present invention, the use of thermally hardenable non-Ni maraging steel alloys, as defined hereinafter, in the magnetoelastic torque transducers of the present invention is limited to creating the necessary residual stresses only after the alloy has been mechanically strengthened by thermal treatment and, then, only by selected residual stress creating processes which are capable of endowing the bands with the desired corresponding and opposite uniform distribution of magnetic anisotropy. Such processes include, but are not limited to, grinding, mechanical scribing (with appropriate tools), directed or masked shot peening or sand blasting, chemical means and heat treatments, including laser scribing, induction, torch, thermal print head, and the like. As a result, although clearly not as flexible in their usage as the nickel maraging steels which can be residually stressed either before or after mechanical hardening and strengthening, and thus are not process limited by the residual stress creating technique employed, the non-Ni maraging steel alloys, as hereinafter defined, play an important role as the ferromagnetic, magnetostrictive shaft element in the magnetoelastic torque transducers of the present invention.

The selection of a residual stress creating process for creating residual stress within the bands of an already hardened steel alloy is based upon many considerations, not the least of which are the size of the shaft, composition of the shaft, number of shafts to be processed, economics, including availability, of the necessary processing apparatus and final topographic appearance of the shaft. In many instances, as a practical matter, the latter consideration will be the controlling factor. Manufacturers of rotating shaft equipment are likely to be reluctant to alter their equipment in any significant manner to accomodate the installation of a magnetoelastic torque transducer, irrespective of the desirability of such an installation. More likely, at least until rotating shaft equipment is designed ab initio to include such torque transducers, is that a suitable transducer will have to be made for each separate application. Considerations such as the environment in which the shaft rotates, the structural integrity of the shaft, the proximity of other components to the rotating shaft, and the like, suggest that equipment manufacturers will prefer that the process employed for forming the bands on or associated with their rotating shafts be selected to minimize the macroscopic topographic alteration of the shaft surface.

In fact, apart from manufacturer reluctance, there are functional reasons for minimizing macroscopic topographic alteration of the shaft surface. In accordance with the present invention residual stress is created within the bands in order to endow the bands with intentionally instilled, controlled magnetic stress anisotropy of a relatively large magnitude. One primary reason is to overwhelm and/or render insignificant uncontrolled and random magnetic anisotropies present in the shaft in order that the torque transducers of the present invention will respond in a predictable manner to permeability changes caused by applied torques. It is, therefore, desirable to minimize factors affecting these permeability changes other than the controlled factor of residual stress-created magnetic anisotropies intentionally instilled in accordance with the present invention. In this connection it has been found that differential macroscopic topographic alteration of the shaft surface such as knurls, slits, ridges, etc., affects the permeability change detected by the magnetic discriminator in addition to the desired magnetoelastic effect. The non-magnetoelastic effect on permeability sensing of differential topographic alteration is threefold. There is a material induced, non-uniform, topographic effect as a result of which the shape and material symmetry in each band is differently altered or distorted when the shaft is subjected to torque. Due to the resolution of an applied torsional stress into orthogonal tensile and compressive stresses, the knurls, slits, etc. in one band will get longer and closer together while the knurls, slits, etc. in the other band will get shorter and further apart. Exciting and sensing coils surrounding the respective bands will effectively see a different amount and/or distribution of magnetic material in each band and, therefore, will sense a different permeability in each. In this manner there will be a permeability sensing effect due to the topographic alteration and independent of the residual stress-created magnetic anisotropies in the bands. In addition, even in a totally annealed shaft, there is a topographic effect on the stress distributions resulting from the application of torque to the shaft. This topographic effect causes the torsional stresses in the bands to distribute differently than they otherwise would in a topographically unaltered band with the result that at least a part of the permeability changes sensed by coils overlying the bands will be due to this topographically influenced stress distribution and not solely due to the desired magnetoelastic effect. Finally, there is the effect on permeability sensing caused by the shape of the topographic alteration. For example, assuming the bands consisted, respectively, of ±45° slits formed in the shaft surface, when a torsional stress is applied to the shaft and a cyclically time varying magnetic field is applied to the bands, depending upon whether the torsional stress is applied CW or CCW, one of the tensile/compressive stresses tends to align the magnetization along the length of one set of slits while the other tends to align the magnetization orthogonally thereto, i.e., in a direction perpendicular to the length of the other set of slits. Apart from magnetoelastic considerations it is, as a physical and configurational matter, easier for the applied magnetization to move along the former than the latter. As a result, the permeability sensed by the coil overlying the band in which the magnetization seeks to align along the length of the slits is higher than the permeability sensed by the coil overlying the band in which the magnetization seeks to align across the length of the slits. This increase in permeability is due in part to the topographic alteration of the band surface. The magnetization is forced to follow a physically more difficult path in moving across rather than along the slits.

Cumulatively, these three reasons explain why all topographically altered shafts work to some extent as torque transducers. It is also the reason why thermal treatment can never remove all permeability change in a topographically altered shaft. By the same token, the effect of topographic alteration of the shaft surface is to introduce extraneous, undesirable, and uncontrolled signals into the permeability sensing function and, to this extent at least, to deviate from the ideal situation wherein strictly magnetoelastic considerations relate the applied torque to the sensed output. Therefore, to the extent possible, macroscopic topographic alteration of the shaft surface should be avoided. This objective is entirely consistent with the application of residual stress after the shaft alloy has been suitably hardened and strengthened by thermal treatment and, therefore, is entirely consistent with the use of selected non-Ni maraging steel alloys, as hereinafter defined, in connection with the present invention.

The various residual stress-creating techniques hereinbefore described, to greater or lesser extents, minimize macroscopic topographic surface alteration. One readily demonstrable technique is grinding wherein a conventional grinding wheel inclined to the axis of the workpiece at ±20° -60° in preparing the respective bands is used to remove an equally small depth of shaft surface, e.g., as little as 0.001 inch, depending upon the geometry of the bands, along the axial length of each band. Inasmuch as grinding merely removes an equal amount of alloy surface material from the respective bands, there is no differential macroscopic topographic alteration—the change in each band is identical and there are no non-uniform topographic features in each band. For all practical purposes, the two bands are topographically identical. A section taken perpendicular to the shaft axis in either band is a circle with only microscopic deviations from a perfect circle. Yet the grinding technique has created two adjacent bands having opposite and corresponding magnetic anisotropy due substantially completely to residual stress created by the grinding process. When torsional stress is applied to the shaft there is no material-induced, non-uniform topographic effect, such as lengthening or shortening of ridges or troughs; there is no topographically-induced differential torsional stress distribution because the topographics of the bands are identical; there is no shape effect due to any topographic differential between the bands. This differs significantly from the situation which exists when knurled regions form the bands. Each knurled region contains different arrangements of troughs and ridges, i.e., distortable shapes and features, differential stress and magnetization influencing topographics, and shape effect imparting features, which separately and cumulatively alter the sensed permeability independent of the residual stress created anisotropy intentionally instilled in the bands. Thus, the application of a torsional stress to a shaft containing spaced-apart knurled bands will always produce an output signal, but the signal will not be solely a function of residual stress-created anisotropy—rather, it will be influenced by the macroscopic topographic alteration of the shaft surface represented by the knurl. As a consequence, all such knurl-containing shafts will appear to function as torque transducers, although it may well be that their output signals are not at all influenced by residual stress-created magnetic anisotropies and bear only a remote relationship to applied torque.

In order to demonstrate how magnetoelastic torque transducers in accordance with the present invention may be made, using non-Ni maraging steel alloys by the application of residual stress to create magnetic anisotropy in the bands following hardening by thermal treatment, several different torque transducers were assembled using ¼-inch and ½-inch diameter cylindrical shafts having formed thereon by a grinding process a pair of axially spaced-apart bands endowed with helically symmetrical LH and RH magnetic easy axes. The characteristics of this arrangement were sensed on the ½-inch shafts by positioning bobbins concentric with the shaft and axially aligned with the bands, each bobbin having a magnetizing and sensing coil mounted thereon. The magnetizing coils were connected in series and driven by an alternating current source. The emf induced in each of the sensing coils was separately rectified with the rectified outputs oppositely connected to produce a difference signal which was displayed on a voltage display instrument. The characteristics of the arrangement were sensed on the ¼-inch diameter shafts using a conventional multivibrator circuit in which only one of two parallel transistors at a time conducts the input from a high frequency source, thus allowing a square wave voltage to create a cyclically time varying magnetic field for application to the bands on the shaft with the result that the inductance of a coil associated with one of the bands increases while the inductance of a coil associated with the other of the bands decrease. This difference in inductance produces different voltage signals which enter a comparator for producing a difference signal which was displayed on a voltage display instrument.

Three shafts formed of different materials were employed for comparative purposes. The materials were T-250, a nickel maraging steel hardened by martensitizing and aging; AISI 416, a through hardened steel; and, SAE 9310, a case hardened steel. The compositions of each alloy are set forth in percent by weight hereinbefore.

Figure 11:
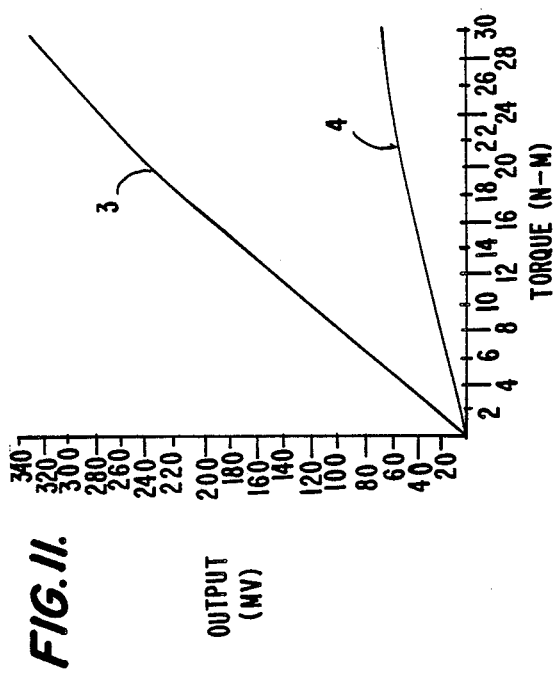
FIGS. 10, 11 and 12 are graphical representations of the relationship between applied torque and output signal for magnetoelastic torque transducers made in accordance with the present invention.
Figure 12:
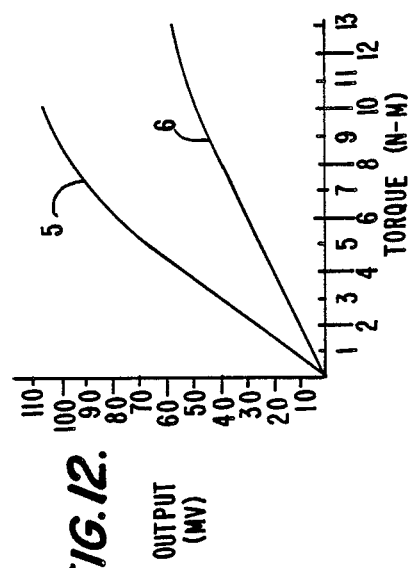
Figure 10:
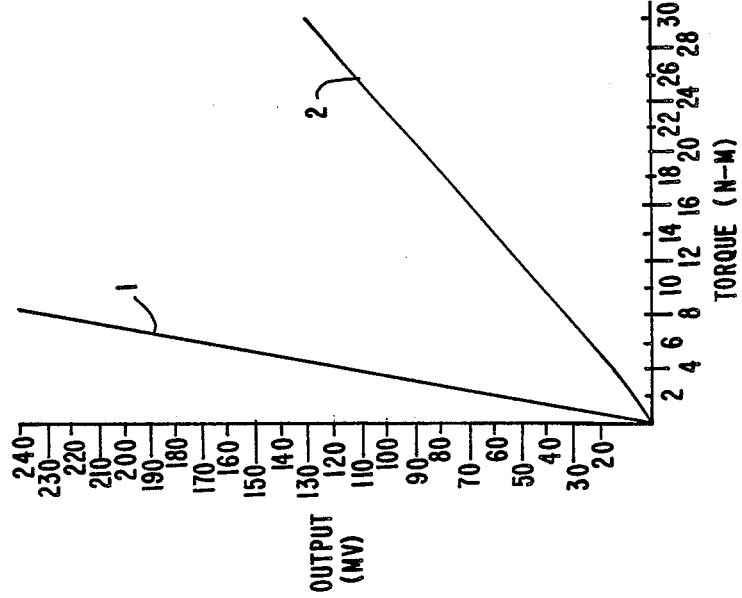

In a first series of runs, each of the alloys was ground in its unhardened condition to form the desired bands of residual stress-created magnetic anisotropy. A known torque loading was applied to each shaft under test and the output voltage signal was recorded. The applied torque was increased from zero up to as high as 30 newton-meters (N-M) with some shafts. FIG. 10, curve "1" (SAE 9310), FIG. 11, curve "3" (AISI 416) and FIG. 12, curve "5" (T-250) are graphs of applied torque versus output d.c. voltage for each shaft ground in the unhardened condition and tested. It is apparent that the sensitivity imparted to the shaft by grinding in each case was excellent and the linearity of the output signal for each over the torque range tested was good, both observations confirming that grinding is an effective technique for imparting residual stress-created magnetic anisotropy to the bands formed on shafts of nickel maraging steel as well as non-Ni maraging steel alloys. Following testing, the nickel maraging steel shaft was aged at 480° C. for incremental periods from 20 minutes to 24 hours. For each increment the performance of the shaft as a torque sensor appeared to improve. This result is consistent with the results observed from FIGS. 5 and 6. The AISI 416 and SAE 9310 shafts were thermally treated at elevated temperatures of about 950° C. and 900° F., respectively. When the foregoing torque loading tests were repeated, the shafts exhibited virtually no output sensitivity to applied torque. This result is in accord with the previously observed results involving torsionally overstrained shafts. The high temperatures corresponding to thermal hardening heat treatment temperatures had destroyed the desirable magnetic properties intentionally imparted to the shafts by the grinding process. Moreover, inasmuch as virtually no output sensitivity remained, it is clear that the grinding process produced insignificant macroscopic topographic alteration of the shaft surfaces.

In a second series of runs, all of the alloys were hardened by thermal treatments appropriate for hardening the particular alloy. The nickel maraging steel shaft was aged at 480° C. for one hour; the AISI 416 was annealed at 950° C. and quenched; and, the SAE 9310 was high temperature treated at about 900° C. in a carburizing atmosphere and quenched to case harden the surface to a depth of 0.04 inches. Thereafter, each of the hardened alloy shafts was ground and tested in the same manner as in the first series of runs. FIG. 10, curve "2" (SAE 9310), FIG. 11, curve "4" (AISI 416) and FIG. 12, curve "6" (T-250) are graphs of applied torque versus output d.c. voltage for each shaft ground in the hardened condition. It is interesting to note that the output sensitivity of the hardened-then-ground shafts was consistently lower than that of the unhardened ground shafts. Even with the nickel maraging steels, although additional aging following grinding of the hardenedthen-ground shafts improved the output sensitivity of the shaft, the maximum sensitivity attainable was still only about ⅔ of that attainable by grinding an unhardened nickel maraging steel shaft. However, the hardened-then-ground shafts consistently exhibited better linearity and hysteresis. These results confirmed that useful magnetoelastic torque transducers can be made using appropriate steel alloys by a technique wherein the residual stress-created bands of magnetic anisotropy are provided to the shaft only after the shaft alloy has been suitably hardened and strengthened by thermal treatment. The observed decrease in output sensitivity and increase in linearity and hysteresis is consistent with the appreciation that in a hardened alloy shaft, which has a much higher elastic limit than a soft alloy shaft, the applied grinding stresses must be higher in order to exceed the elastic limit for creating residual stress within the bands. The resulting residual stresses are, therefore, much higher than when grinding is accomplished on a soft alloy shaft. As a result, the total quiescent anisotropy ("K") of the alloy shaft system (including anisotropy resulting from residual stresses, shape, crystallinity, etc.) before the application of torsional stress to the shaft is higher for a hardened than for a soft alloy shaft. It will be appreciated that the permeability effect of an applied stress is directly proportional to the magnetostriction of the alloy and the applied stress and is inversely proportional to the quiescent anisotropy of the system. Therefore, when torque is applied to a high "K" system, the effect of the applied stress is smaller and the observed sensitivity or effect on permeability is likewise smaller. For substantially the same reasons, the higher "K" causes a lower hysteresis and improved linearity.

It has already been noted that effective magnetoelastic torque transducers in accordance with the present invention can be made using nickel maraging steel as the ferromagnetic and magnetostrictive shaft component and instilling desired magnetic anisotropy in the shaft by creating residual stress within the bands either before or after the nickel maraging steel alloy has been aged to improve its mechanical and strength properties. It has also been noted that effective magnetoelastic torque transducers in accordance with the present invention can be made using selected non-Ni maraging steel alloys and creating the residual stress within the bands only after the non-Ni maraging steel alloys have been appropriately thermally treated to improve their mechanical and strength characteristics. It is clear for many reasons that not all non-Ni maraging steel alloys can be so employed. Typically, in annealed iron-carbon alloys of varying carbon contents, the magnetostriction, i.e., the functional change in length in an applied magnetic field, is anisotropic and, in some directions, is negative. In many instances the alloy undergoes a Villari reversal —it first expands with increasing field strength, i.e., the fractional change in length is positive, and then contracts, i.e., the fractional change in length is negative with increasing field strength. When torque is applied to a shaft formed of an alloy which undergoes such a reversal the stress-applied anisotropy affects the existing random anisotropy differently in shaft areas of positive magnetostriction than in areas of negative magnetostriction. This leads to a varying combined anisotropy at different locations in the shaft due to the anisotropic local magnetostriction with the result that a uniform, resulting magnetization cannot be obtained. For obvious reasons this is an unacceptable condition in a torque transducer and alloys which undergo the Villari reversal are obviously unacceptable for use. It has been known for some time that alloying with certain elements, e.g., nickel, causes the magnetostriction of the resultant alloy to become more positive. In fact, it has been noted that only 1 to 3 percent by weight nickel is needed to eliminate the Villari reversal contraction of iron-carbon alloys. Thus, as the original iron-carbon alloy becomes richer in nickel the alloy behaves as though its magnetostriction is positive at all field strengths such that the combined anisotropy at different locations in the shaft becomes more uniform and a uniform resulting magnetization can be obtained. A similar trend has been noted with the addition of other alloying elements, e.g., chromium (Cr), cobalt (Co), titanium (Ti), aluminum (Al), manganese (Mn), molybdenum (Mo), copper (Cu), boron (B), and combinations thereof, toward making the magnetostriction of the iron-carbon alloy system more positive. Another means for dealing with the Villari reversal in the iron-carbon alloy system is to anneal at high temperatures of about 750–800° C. and then quench without further annealing to temper. Such a treatment appears to substantially eliminate the Villari reversal to produce a hardened iron-carbon alloy system having a substantially isotropic magnetostriction. Hardening by thermal treatment, in addition, eliminates cold working stresses and the attendant random anisotropy due to prior processing and improves the hysteresis and linearity response aspects of the effect of torsional stress on permeability.

It has, therefore been determined, in accordance with the present invention, that non-Ni maraging steel alloys useful as the ferromagnetic, magnetostrictive region of or associated with the rotating shaft should have a substantially isotropic, high magnetostriction having an absolute value of at least 5 ppm; been hardened by thermal treatment; a carbon content, in percent by weight, in the range from 0.05 to 0.75 percent; an alloy composition tailored to the mechanical, chemical and magnetic (resulting anisotropy and magnetostriction) requirements of the intended application of the shaft.

All of the foregoing can be achieved by selecting the non-Ni maraging steel alloy useful in the present invention from thermally hardened steel alloys characterized by an isotropic magnetostriction having an absolute value of at least 5 ppm and a composition comprising the following elements in the indicated proportions:

, $FeC_aM_bQ_c$ wherein "M" is one or more alloying elements selected from the group consisting of Ni, Cr, Co, Ti, Al, Mn, Mo, Cu and B, "Q" is one or more other alloying elements including, but not limited to, common steel alloying elements such as silicon (Si), phosphorous (P), sulfur (S), nitrogen (N), selenium (Se), tungsten (W), vanadium (V), hafnium (Hf), columbium (Cb), tantalum (Ta) and tin (Sn);

"a" indicates a carbon content of from 0.05 to 0.75 percent by weight;

"b" indicates a content of alloying element(s) "M" at least sufficient to raise the magnetostriction of the alloy to the at least 5 ppm absolute level, the desired level of magnetostriction depending upon the quiescent anisotropy ("K") and applied stress due to applied torque for any given application;

"c" indicates a content of alloying element,(s) "Q" from zero up to any useful quantity dependent upon the desired mechanical, chemical, and/or other properties of the alloy.

Applying the foregoing definition of a suitable non-Ni maraging steel alloy to several of the illustrative steel alloys discussed hereinbefore and applying published magnetostriction data for various of the alloying elements, the magnetostriction of the alloys can be at least estimated. For example: for AISI 410, the presence of 12.3% Cr is primarily responsible for raising the magnetostriction of the alloy to about 20 ppm; for AISI 502, the presence of 5% Cr and 0.8 Mn are primarily responsible for raising the magnetostriction of the alloy to about 7 ppm; for SAE 9310, the presence of 3–3.5% Ni and 1–1.4% Cr are primarily responsible for raising the magnetostriction of the alloy to about 15 ppm.

Industrial Applicability

The unique and improved magnetoelastic torque transducers of the present invention are broadly useful for the sensing and measurement of torque in members of all types and sizes, whatever may be the device or field of application in which the member operates. It is universally accepted that torque is an absolutely fundamental parameter in the control of systems having rotating members. Sensing the instantaneous torque experienced by a rotating member and generating an electrical current in response thereto which bears a known relationship to the torque allows the early diagnosis of incipient problems or the control, via microprocessor or otherwise, of the engine, machine, motor, etc. which drives the rotary member.

Applications for the torque transducers of the present invention can be found in virtually every device having a rotating member. There already is a demand for sensitive, responsive, and inexpensive magnetic torque sensors for monitoring torque in engines and power drives to improve overall performance and fuel economy, control exhaust emissions and modulate transmission ratios; in marine propulsion systems to detect and correct reduced output from the propulsion machinery and the effects of hull fouling and propeller damage; in helicopter turbines to avoid overloading and to detect power loss caused, for example, by sand or salt spray. There is also a demand for torque transducers such as are provided in accordance with the present invention for controlling heavy industrial machinery of all types, e.g., pulp grinders for maintaining fiber quality, papermaking machines, and the like, as well as for use in consumer home and commercial appliances, e.g., food mixers and processors. In addition to their use in internal combustion engines, power transmission means, fluid turbine means, etc., the need for small, inexpensive, sensitive, reliable torque sensors has been noted in such diverse applications as machine tools, hand tools, robotics, force measuring systems, information devices, industrial measuring instruments, weighing systems of various kinds, electronic power assisted power steering, and vehicular traction balancing.

Figure 13:
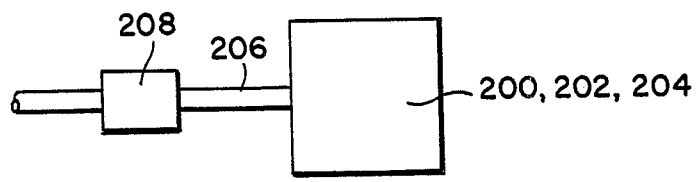
FIG. 13 is a schematic representation of an exemplary device, e.g., internal combustion engine, power transmission means or fluid turbine means, incorporating the magnetoelastic torque transducer of the present invention.
Figure 14:
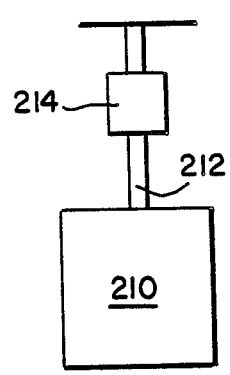
FIG. 14 is a schematic representation of a weighing system incorporating the magnetoelastic torque transducer of the present invention.
Figure 15:
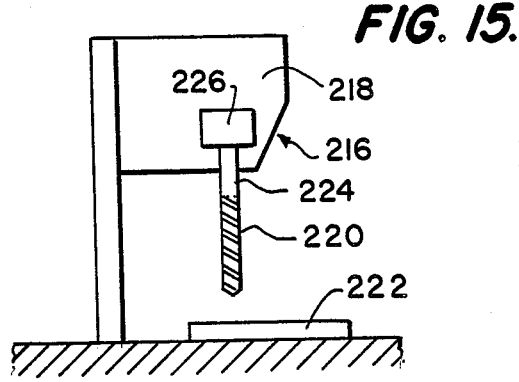
FIG. 15 is a schematic representation of a machine tool incorporating the magnetoelastic torque transducer of the present invention.
Figure 16:
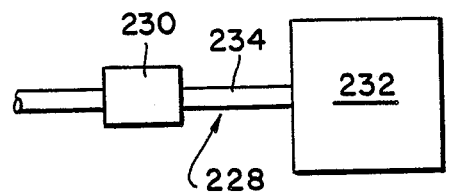
FIG. 16 is a schematic representation of a robotic device incorporating the magnetoelastic torque transducer of the present invention.
Figure 17:
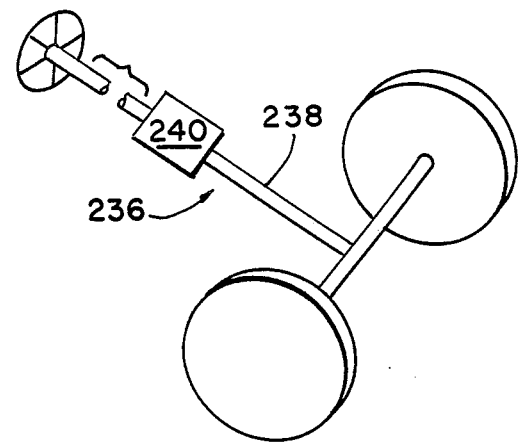
FIG. 17 is a schematic representation of a vehicular steering system incorporating the magnetoelastic torque transducer of the present invention.
Figure 18:
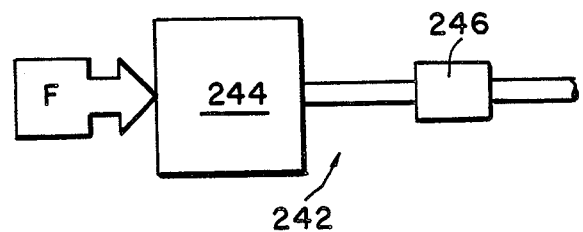
FIG. 18 is a schematic representation of a force measuring system incorporating the magnetoelastic torque transducer of the present invention.

FIGS. 13–18 schematically illustrate several of these applications. Referring, for example, to FIG. 13, an internal combustion engine 200 or power transmission means 202 or fluid turbine means 204 includes a torque-carrying output member 206, the member further including a magnetoelastic torque transducer 208, as described and illustrated herein, for sensing the torque developed in member 206. In FIG. 14, there is illustrated a weighing system 210 including torque-carrying means 212 and a magnetoelastic torque transducer 214, as described and illustrated herein, for sensing the torque developed in means 212. FIG. 15 shows a machine tool 216 including means 218 for causing relative rotation between a tool 220 and a workpiece 222, the machine tool having a torque-carrying member 224 including a magnetoelastic torque transducer 226, as described and illustrated herein, for sensing the torque developed in member 224. A robotic device 228 including a magnetoelastic torque transducer 230, as described and illustrated herein, is illustrated in FIG. 16. The robotic device comprises mechanical means 232 for performing work pursuant to pre-programmed or real time control instructions and a torque-carrying member 234. In FIG. 17, there is depicted a vehicular steering system 236 having torque-carrying shaft means 238, the shaft means including a magnetoelastic torque transducer 240, as described and illustrated herein, for sensing the torque developed in shaft means 238. FIG. 18 shows a force measuring system 242 including means 244 for converting a sensed force, F, to torque and a magnetoelastic torque transducer 246, as described and illustrated herein, for sensing the torque resulting from the conversion by means 244.

One application for the magnetoelastic torque transducers of the present invention which is particularly promising in view of the potential contribution of these transducers to energy conservation, environmental cleanliness and safety and because it directly affects so many people and businesses is its use on internal combustion engines and associated engine power drives. The torque sensor of the present invention is capable of recovering the torque signature of an engine over a wide enough bandwidth to discern salient details of important torque contributing events at all points between idle and the top operating speed of the engine. Torque sensing in an accurate and cost effective manner enables early diagnosis of incipient problems due to the functional condition of the engine, helps to avoid unanticipated failures that might limit the servicability of the vehicle at critical times and improves and/or controls the performance and economy of the engine and its power drive.

Primary power for the propulsion and other essential functions of modern vehicles is obtained from the rotating output shaft of an internal combustion engine. Regardless of the type of engine the power actually delivered by this shaft to the vehicle is the numerical product of only two parameters: rotational speed and transmitted torque. Of the two, torque is the intensive parameter since rotational speed is itself consequential to the internally developed torque of the engine. It is the magnitude of available torque that sets the limits on vehicle acceleration, its speed on grade and other mobility and performance factors. The successful use and enjoyment of the vehicle depends, ultimately, on the ability of its engine to deliver the functionally required torque throughout its operational range of speeds.

Except for the situation where a turbine engine is driving a constant load, the torque transmitted through an engine output shaft fluctuates rapidly. These fluctuations reflect both the cyclic variations in the torque developed by the engine and transient variations in the torque imposed by vehicle loads. In piston engines, torque is developed by each cylinder only during its power stroke. Multicylinder engines attain some continuity of developed torque by the overlap of phased power strokes from each cylinder. While cyclic variations in output torque are also reduced thereby, and further reduced by the combined inertia of the engine's internal moving parts, the strongly impulsive nature of each cylinder's developed torque is still transmitted through the output shaft. Cyclically stimulated torsional vibrations together with the changing accelerations of linked reciprocating parts contribute additional time varying torque components. The magnitude and even the directional sense of this torque is further influenced by variations in operational conditions of the vehicle, e.g., throttle settings, gear positions, load pickup, road surface inclination and roughness features.

Although the torque on the engine output shaft represents the superposition of contributions from this multiplicity of sources, many are strongly interdependent and their combination forms an effective signature characterizing the engine's performance. Salient features of this signature would clearly correlate with specific engine events, e.g., cylinder firings. The absence of a normal feature, its alteration or the development of new features would be a reflection of a dysfunction. The nature and extent of the abnormality would be symptomatic of specific engine or drive line difficulties. While many engine problems are also detectable by their symptomatic effects on overall performance and/or more objectively measurable quantities (e.g., manifold pressure, compression, noise signature, exhaust gas analysis), none are as sensitively quantified as torque to the individual events which together characterize proper engine function. Since torque is the effective product of the engine, no measurements of indirectly related parameters can so clearly identify the source of inadequate production as can the measurement of torque itself. Conventional methods of recovering torque data, whether by dynamometer or from measurements of unloaded engine acceleration and deceleration by procedures involving stepped changes in fuel flow and/or ignition interruption, determine only average values and lack the detail needed for clear diagnosis and control. Recovery and analysis of the information contained in the torque signature of the engine output shaft enables diagnosis of incipient problems, helps to avoid unanticipated failures that might limit the servicability of the vehicle at critical times and improves and/or controls the performance and economy of the engine and its power drive. The key to the problem is the recovery of enough torque information for a meaningful analysis.

In a 12 cylinder, 4 stroke engine operating at 4000 rpm there are 400 power strokes and (at least) 1600 valving events (openings or closings) every second. Turbine engines run with far smoother power input but at speeds up to 500 revolutions per second. To be capable of discriminating important details of these salient events, the torque sensing system must have a reasonably flat frequency response up to at least several times the maximum event rate, i.e., in the vicinity of 5 kHz. The frequency response must also extend downward to zero Hz to faithfully capture the steady state torque components imposed by the vehicle loads.

Although that full bandwidth is obviously desirable for maximum utility as a diagnostic tool, the information contained in the low frequency spectrum, up to 10 Hz, accurately describes the engine's overall response to control (input) and load (output) changes. Not only can variations in performance be objectively evaluated from this information but i t also has potentially prime utility in another area, control of the engine and associated power drive.

A torque sensor having 5 kHz bandwidth capability cannot be positioned arbitrarily. While torque is applied to the engine shaft by contact forces at discrete locations, it is transmitted axially by continuous stress distributions. Transient torque events are not transmitted instantaneously nor do they remain unaltered along the shaft. The finite elasticity and inertia of real shaft materials combine to limit the transmittable rate of change of torque. Steep transients trigger oscillatory exchanges of elastic and kinetic energy (stress waves) which travel with material and mode dependent characteristic velocities along the shaft. The fidelity of the transmitted torque is further reduced with distance from its source by the accumulated dissipative effects of internal and external friction. The sensor must therefore be located close enough to the source(s) to avoid losing the desired torque information either by attenuation or in background "noise" composed of complex combinations of interfering and reflecting stress waves.

Important sensor requirements are that it be small, at least in the dimension parallel to the shaft axis, that it be rugged and that it be free from deteriorating effects of use or time such as wear, corrosion or fatigue. The sensor should be amenable to performance verification and calibration, especially in the event of repair or replacement of parts of the torque sensing system, including the engine shaft. It should have negligble impact on engine and drive line manufacturability, operation and maintenance and, under no circumstances should the failure of the torque sensor have any contingent consequences which interfere with the otherwise normal operation of the vehicle.

The context is clear, whether for engines, power drives or other uses, a suitable torque sensor should be an unobtrusive device that is difficult to abuse and is capable of reliably recovering much of the torque information available on the torqued shaft. None of the heretofore contemplated state of the art torque transducers can meet these requirements. However, the magnetoelastic torque sensors of the present invention appear eminently suitable in all respects and will, for the first time, make inexpensive, reliable and sensitive torque sensors available for commercial implementation.

I claim:

1. A magnetoelastic torque transducer for providing an electrical signal indicative of the torque applied to a member, said member having a ferromagnetic and magnetostrictive region formed of a thermally hardened steel alloy characterized by a substantially isotropic magnetostriction having an absolute value of at least 5 ppm and including from 0.05 to 0.75 percent by weight carbon and sufficient of an element selected from the group consisting of nickel, chromium, cobalt, titanium, aluminum, manganese, molybdenum, copper, boron, and combinations thereof to raise said alloy magnetostriction value to said at least 5 ppm absolute, said transducer comprising:

a pair of axially spaced-apart annular bands defined within said region, said bands having respectively symmetrical right and left hand helically directed residual stress created magnetic anisotropy of sufficiently large magnitude compared with the random magnetic anisotropy in said member that the contribution to total magnetic anisotropy of any random anisotropy is negligible, each said band having at least one circumferential region which is free of residually unstressed areas over at least 50% of its circumferential length;

means for applying a cyclically time varying magnetic field to said bands;

means for sensing the change in permeability of said bands caused by said applied torque; and, means for converting said sensed change in permeability to an electrical signal indicative of the magnitude of the torque applied to said member.

2. A magnetoelastic torque transducer, as claimed in claim 1, wherein each said band has at least one circumferential region which is free of residually unstressed areas over at least 80% of its circumferential length.

3. A magnetoelastic torque transducer, as claimed in claim 1, wherein said band has at least one continuous circumferential region which is free of residually unstressed areas.

4. A magnetoelastic torque transducer, as claimed in claim 1, wherein said alloy further includes from zero up to a useful quantity for imparting desired properties to said alloy of an element selected from the group consisting of silicon, phosphorous, sulfur, nitrogen, selenium, tungsten, vanadium, hafnium, columbium, tantalum, tin, and combinations thereof.

5. A magnetoelastic torque transducer, as claimed in claim 1, wherein said region is formed of a thermally hardened steel alloy consisting essentially of the elements and proportions indicated by the general formula:

$$, FeC_aM_bQ_c$$

wherein:

"M" is an element selected from the group consisting of nickel, chromium, cobalt, titanium, aluminum, manganese, molybdenum, copper, boron, and combinations thereof;

"Q" is an element selected from the group consisting of silicon, phosphorous, sulfur, nitrogen, selenium, tungsten, vandadium, hafnium, columbium, tantalum, tin and combinations thereof;

"a" indicates a carbon content of from 0.05 to 0.75 percent by weight;

"b" indicates a content of element "M" at least sufficient to raise the magnetostriction of said alloy to at least 5 ppm absolute; and "c" indicates a content of element "Q" from zero to a useful quantity for imparting desired properties to said alloy.

6. A magnetoelastic torque transducer, as claimed in claim 1, wherein said region forms a part of the surface of said member.

7. A magnetoelastic torque transducer, as claimed in claim 1, wherein said region is rigidly affixed to the surface of said member.

8. A magnetoelastic torque transducer, as claimed in claim 1, wherein said region is formed of a steel alloy selected from the group consisting of through hardenable and case hardenable steel alloys.

9. A magnetoelastic torque transducer, as claimed in claim 1, wherein the magnetic easy axes in said bands are oriented, respectively, at angles of ±20° -60° to the axis of said member.

10. A magnetoelastic torque transducer, as claimed in claim 1, wherein said region is formed of nickel maraging steel and said bands are defined and said residual stress-created magnetic anisotropy has been instilled within a mechanically soft portion of said region.

11. A magnetoelastic torque transducer for providing an electrical signal indicative of the torque applied to a member, said member having a ferromagnetic and magnetostrictive region, said transducer comprising:

a pair of axially spaced-apart annular bands defined within a thermally hardened portion of said region, said bands having respectively symmetrical right and left hand helically directed residual stress created magnetic anisotropy instilled therein subsequent to thermal hardening of sufficiently large magnitude compared with the random magnetic anisotropy in said member that the contribution to total magnetic anisotropy of any random anisotropy is negligible, each said band having at least one circumferential region which is free of residually unstressed areas over at least 50% of its circumferential length;

means for applying a cyclically time varying magnetic field to said bands;

means for sensing the change in permeability of said bands caused by said applied torque; and means for converting said sensed change in permeability to an electrical signal indicative of the magnitude of the torque applied to said member.

12. A magnetoelastic torque transducer, as claimed in claim 11, wherein said region is formed of a steel alloy selected from the group consisting of iron-nickel martensite hardenable and thermally hardened steel alloys characterized by a substantially isotropic magnetostriction having an absolute value of at least 5 ppm and including from 0.05 to 0.75 percent by weight carbon and sufficient of an element selected from the group consisting of nickel, chromium, cobalt, titanium, aluminum, manganese, molybdenum, copper, boron, and combinations thereof to raise said alloy magnetostriction value to said at least 5 ppm absolute.

13. In a magnetoelastic torque transducer for providing an electrical signal indicative of the torque applied to a member including ferromagnetic, magnetostrictive means associated with said member for altering in magnetic permeability in response to the application of torque to said member, means for applying a magnetic field to said ferromagnetic magnetostrictive means, means for sensing the change in permeability caused by said applied torque, and means for converting said sensed change in permeability to an electrical signal indicative of the magnitude of the torque applied to said member, the improvement comprising forming said ferromagnetic, magnetostrictive means from a thermally hardened steel alloy characterized by a substantially isotropic magnetostriction having an absolute value of at least 5 ppm and including from 0.05 to 0.75 percent by weight carbon and sufficient of an element selected from the group consisting of nickel, chromium, cobalt, titanium, aluminum, manganese, molybdenum, copper, boron, and combinations thereof to raise said alloy magnetostriction value to said at least 5 ppm absolute.

14. A magnetoelastic torque transducer, as claimed in claim 13, wherein said alloy further includes from zero up to a useful quantity for imparting desired properties to said alloy of an element selected from the group consisting of silicon, phosphorous, sulfur, nitrogen, selenium, tungsten, vanadium, hafnium, columbium, tantalum, tin, and combinations thereof.

15. A magnetoelastic torque transducer, as claimed in claim 13, wherein said means is formed of a thermally hardened steel alloy consisting essentially of the elements and proportions indicated by the general formula:

$FeC_aM_bQ_c$ FeC wherein:
"M" is an element selected from the group consisting of nickel, chromium, cobalt, titanium, aluminum, manganese, molybdenum, copper, boron, and combinations thereof;
"Q" is an element selected from the group consisting of silicon, phosphorous, sulfur, nitrogen, selenium, tungsten, vanadium, hafnium, columbium, tantalum, tin and combinations thereof;
"a" indicates a carbon content of from 0.05 to 0.75 percent by weight;
"b" indicates a content of element "M" at least sufficient to raise the magnetostriction of said alloy to at least 5 ppm absolute; and
"c" indicates a content of element "Q" from zero to a useful quantity for imparting desired properties to said alloy.

16. A magnetoelastic torque transducer, as claimed in claim 13, wherein said ferromagnetic, magnetostrictive means forms a part of the surface of said member.

17. A magnetoelastic torque transducer, as claimed in claim 13, wherein said ferromagnetic, magnetostrictive means is rigidly affixed to the surface of said member.

18. A magnetoelastic torque transducer, as claimed in claims 13, 16, or 17, wherein said ferromagnetic, magnetostrictive means is formed of a steel alloy selected from the group consisting of through hardenable and case hardenable steel alloys.

19. A magnetoelastic torque transducer, as claimed in claims 13, 16, or 17, wherein at least a portion of said ferromagnetic, magnetostrictive means is endowed with helically directed residual stress created magnetic anisotropy, at least one circumferential region of said portion being free of residually unstressed areas over at least 50% of its circumferential length, said applying means applying said magnetic field to said endowed portion and to an area of said member not so endowed, said sensing means sensing the permeability difference between said portion and said area resulting from the application of torque to said member, said converting means converting said sensed permeability difference to an electrical signal indicative of the magnitude of the applied torque.

20. A magnetoelastic torque transducer, as claimed in claim 19, wherein said portion is a thermally hardened portion of said ferromagnetic, magnetostrictive means, said residual stress-created magnetic anisotropy having been instilled in said portion subsequent to thermal hardening.

21. A magnetoelastic torque transducer, as claimed in claim 19, wherein said circumferential region is free of residually unstressed areas over at least 80% of its circumferential length.

22. A magnetoelastic torque transducer, as claimed in claim 19, wherein said portion has at least one continuous circumferential region which is free of residually unstressed areas.

23. A magnetoelastic torque transducer, as claimed in claims 13, 16, or 17, wherein said ferromagnetic, magnetostrictive means includes a pair of axially spaced-apart annular bands defined therewithin, said bands having respectively symmetrical right and left hand helically directed residual stress created magnetic anisotropy, each said band having at least one circumferential region which is free of residually unstressed areas over at least 50% of its circumferential length, said applying means applying said magnetic field to said bands, said sensing means sensing the change in permeability of said bands caused by said applied torque.

24. A magnetoelastic torque transducer, as claimed in claim 23, wherein each said band has at least one circumferential region which is free of residually unstressed areas over at least 80% of its circumferential length.

25. A magnetoelastic torque transducer, as claimed in claim 23, wherein each said band has at least one continuous circumferential region which is free of residually unstressed areas.

26. A magnetoelastic torque transducer, as claimed in claim 23, wherein the magnetic easy axes in said bands are oriented, respectively, at angles of ±20° -60° to the axis of said member.

27. A magnetoelastic torque transducer, as claimed in claim 23, wherein said bands are defined within a thermally hardened portion of said means, said residual stress-created magnetic anisotropy having been instilled in said bands subsequent to thermal hardening.

28. A magnetoelastic torque transducer, as claimed in claim 23, wherein said means is formed of a thermally hardened steel alloy consisting essentially of the elements and proportions indicated by the general formula:

, $FeC_aM_bQ_c$ wherein:
"M" is an element selected from the group consisting of nickel, chromium, cobalt, titanium, aluminum, manganese, molybdenum, copper, boron, and combinations thereof;
"Q" is an element selected from the group consisting of silicon, phosphorous, sulfur, nitrogen, selenium, tungsten, vanadium, hafnium, columbium, tantalum, tin and combinations thereof;
"a" indicates a carbon content of from 0.05 to 0.75 percent by weight;
"b" indicates a content of element "M" at least sufficient to raise the magnetostriction of said alloy to at least 5 ppm absolute; and
"c" indicates a content of element "Q" from zero to a useful quantity for imparting desired properties to said alloy.

29. In a method of sensing the torque applied to a member having ferromagnetic, magnetostrictive means associated therewith which includes the steps of applying a magnetic field to said ferromagnetic, magnetostrictive means, sensing the change in permeability caused by said applied torque and converting said sensed change in permeability to an electrical signal indicative of the magnitude of the applied torque, the improvement comprising forming said ferromagnetic, magnetostrictive means of a thermally hardened steel alloy characterized by a substantially isotropic magnetostriction having an absolute value of at least 5 ppm and including from 0.05 to 0.75 percent by weight carbon and sufficient of an element selected from the group consisting of nickel, chromium, cobalt, titanium, aluminum, manganese, molybdenum, copper, boron, and combinations thereof to raise said alloy magnetostriction value to said at least 5 ppm absolute.

30. A method, as claimed in claim 29, wherein said alloy further includes from zero up to a useful quantity for imparting desired properties to said alloy of an element selected from the group consisting of silicon, phosphorous, sulfur, nitrogen, selenium, tungsten, vanadium, hafnium, columbium, tantalum, tin, and combinations thereof.

31. A method, as claimed in claim 29, wherein said steel alloy is selected from the group consisting of through hardenable and case hardenable steel alloys.

32. A method, as claimed in claim 29, wherein said ferromagnetic, magnetostrictive means is endowed with a pair of axially spaced-apart annular bands having respectively symmetrical right and left hand helically directed residual stress-created magnetic anisotropy, the permeability difference between the bands is sensed, and said sensed permeability difference is converted to an electrical signal indicative of the magnitude of the applied torque.

33. A method, as claimed in claim 32, wherein said ferromagnetic, magnetostrictive means is thermally hardened, at least within the region thereof wherein said bands are located, for imparting desirable mechanical properties to the material from which said region is formed and endowing said thermally hardened means with said bands having said residual stress-created anisotropy.

34. In a method of sensing the torque applied to a member having a ferromagnetic and magnetostrictive region including the steps of endowing at least a portion of said region with helically directed residual stress-created magnetic anisotropy, applying a cyclically time varying magnetic field to said portion and to an area of said member not so endowed, and sensing the permeability difference between said portion and said area resulting from the application of torque to said member, the difference being indicative of the magnitude of the applied torque, the improvement comprising forming said region of a thermally hardened steel alloy characterized by a substantially isotropic magnetostriction having an absolute value of at least 5 ppm and including from 0.05 to 0.75 percent by weight carbon and sufficient of an element selected from the group consisting of nickel, chromium, cobalt, titanium, aluminum, manganese, molybdenum, copper, boron, and combinations thereof to raise said alloy magnetostriction value to said at least 5 ppm absolute.

35. A method as claimed in claim 34, wherein said alloy further includes from zero up to a useful quantity for imparting desired properties to said alloy of an element selected from the group consisting of silicon, phosphorous, sulfur, nitrogen, selenium, tungsten, vanadium, hafnium, columbium, tantalum, tin, and combinations thereof.

36. A method as claimed in claim 34, wherein said portion is thermally hardened, at least where said portion is endowed with said magnetic anisotropy, for imparting desirable mechanical properties to the material from which said region is formed, and endowing said thermally hardened portion with said magnetic anisotropy.

37. In a method of sensing the torque applied to a member having a ferromagnetic and magnetostrictive region, including the steps of endowing a pair of axially spaced-apart annular bands within said region with respectively symmetrical right and left hand helically directed magnetic anisotropy, applying a cyclically time varying magnetic field to said bands, and sensing the permeability difference between said bands resulting from the application of torque to said member, the difference being indicative of the magnitude of the applied torque, the improvement comprising:

thermally hardening said member, at least within said region, for imparting desirable mechanical properties to the material from which said region is formed;

defining said bands at the surface of said thermally hardened member; and, endowing said bands with magnetic anisotropy by instilling a residual stress distribution in each band which is sufficiently extensive that at least one circumferential region within each band is free of residually unstressed areas over at least 50% of its circumferential length.

38. A method, as claimed in claim 37, wherein said instilled residual stress distribution is sufficiently extensive that said region is free of residually unstressed areas over at least 80% of its circumferential length.

39. A method, as claimed in claim 37, wherein said instilled residual stress distribution is sufficiently extensive that each said band has at least one continuous circumferential region which is free of residually unstressed areas.

40. A method, as claimed in claims 37, 38 or 39, wherein said region is formed of a steel alloy selected from the group consisting of iron-nickel martensite hardenable and thermally hardened steel alloys characterized by a substantially isotropic magnetostriction having an absolute value of at least 5 ppm and including from 0.05 to 0.75 percent by weight carbon and sufficient of an element selected from the group consisting of nickel, chromium, cobalt, titanium, aluminum, manganese, molybdenum, copper, boron, and combinations thereof to raise said alloy magnetostriction value to said at least 5 ppm absolute.

41. A method as claimed in claim 40, wherein said alloy further includes from zero up to a useful quantity for imparting desired properties to said alloy of an element selected from the group consisting of silicon, phosphorous, sulfur, nitrogen, selenium, tungsten, vanadium, hafnium, columbium, tantalum, tin, and combinations thereof.

42. A method, as claimed in claims 37, 38 or 39, wherein said region is formed of a thermally hardened steel alloy consisting essentially of the elements and proportions indicated by the general formula:

$$, FeC_aM_bQ_c$$

wherein:
"M" is an element selected from the group consisting of nickel, chromium, cobalt, titanium, aluminum, manganese, molybdenum, copper, boron, and combinations thereof;

"Q" is an element selected from the group consisting of silicon, phosphorous, sulfur, nitrogen, selenium, tungsten, vandadium, hafnium, columbium, tantalum, tin and combinations thereof;

"a" indicates a carbon content of from 0.05 to 0.75 percent by weight;

"b" indicates a content of element "M" at least sufficient to raise the magnetostriction of said alloy to at least 5 ppm absolute; and "c" indicates a content of element "Q" from zero to a useful quantity for imparting desired properties to said alloy.

43. An internal combustion engine having a torque-carrying output member, said member including a magnetoelastic torque transducer as claimed in claims 1 or 13.

44. Power transmission means having a torque-carrying output member, said member including a magnetoelastic torque transducer as claimed in claims 1 or 13.

45. Fluid turbine means having a torque-carrying output member, said member including a magnetoelastic torque transducer as claimed in claims 1 or 13.

46. A weighing system including torque-carrying means, said means including a magnetoelastic torque transducer as claimed in claims 1 or 13.

47. A machine tool including means for causing relative rotation between a tool and a workpiece, said machine tool having a torque-carrying member, said member including a magnetoelastic torque transducer as claimed in claims 1 or 13.

48. A robotic device comprising mechanical means for performing work pursuant to pre-programmed or real time control instructions, said device having a torque-carrying member, said member including a magnetoelastic torque transducer as claimed in claims 1 or 13.

49. A vehicular steering system having torque-carrying shaft means, said means including a magnetoelastic torque transducer as claimed in claims 1 or 13.

50. A force measuring system including means for converting a sensed force to torque, a torque transducer connected for sensing said torque, said torque transducer comprising a magnetoelastic torque transducer as claimed in claims 1 or 13.

* * * * *